US012275257B2

(12) United States Patent
Taruya et al.

(10) Patent No.: US 12,275,257 B2
(45) Date of Patent: Apr. 15, 2025

(54) TAPE CARTRIDGE, TAPE ROLL, AND TAPE CARTRIDGE SET

(71) Applicant: SEIKO EPSON CORPORATION, Tokyo (JP)

(72) Inventors: Keisuke Taruya, Shiojiri (JP); Taishi Sasaki, Matsumoto (JP); Akio Ishimoto, Shiojiri (JP); Hirosuke Yasuki, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 258 days.

(21) Appl. No.: 18/180,506

(22) Filed: Mar. 8, 2023

(65) Prior Publication Data

US 2023/0302837 A1 Sep. 28, 2023

(30) Foreign Application Priority Data

Mar. 9, 2022 (JP) ................................ 2022-036628
Sep. 26, 2022 (JP) ................................ 2022-153012

(51) Int. Cl.

*B41J 32/00* (2006.01)
*B41J 15/04* (2006.01)
*B41J 35/36* (2006.01)
*B41J 17/32* (2006.01)

(52) U.S. Cl.

CPC ............ *B41J 32/00* (2013.01); *B41J 15/044* (2013.01); *B41J 35/36* (2013.01); *B41J 17/32* (2013.01)

(58) Field of Classification Search

CPC . B41J 32/00; B41J 15/044; B41J 35/36; B41J 17/32

See application file for complete search history.

(56) References Cited

U.S. PATENT DOCUMENTS 4,212,551 A * 7/1980 Marsico .................. B41J 33/14 400/208
5,518,328 A * 5/1996 Okuchi .................. B41J 35/28 400/208
5,597,247 A * 1/1997 Inakoshi .................. B41J 35/28 400/208
10,807,382 B2 * 10/2020 Kubota .................. B41J 35/28
2007/0264071 A1 11/2007 Takahashi
2014/0037359 A1 2/2014 Nakajima et al.

(Continued)

FOREIGN PATENT DOCUMENTS

JP 2001-114456 A 4/2001
JP 2007080392 A * 3/2007 .......... G11B 15/672

(Continued)

*Primary Examiner* — Justin Seo
*Assistant Examiner* — Tracey M McMillion
(74) *Attorney, Agent, or Firm* — Oliff PLC

(57) ABSTRACT

There is provided a tape cartridge, in which the cartridge case is provided with an outer protrusion portion received by an outer recess portion, the outer protrusion portion blocks insertion of a third core projection into a core hole of a tape core B around which a tape B, which is different in type from the tape A, is wound and which has a shape different from that of the tape core A, by contact with the tape core B when the tape roll A is mistakenly replaced with a tape roll B included in a tape cartridge B, which is configured to be mounted on a tape printing apparatus, and including the tape B and the tape core B.

11 Claims, 36 Drawing Sheets

(56) References Cited

U.S. PATENT DOCUMENTS

| | | | | |
|---|---|---|---|---|
| 2020/0307292 | A1* | 10/2020 | Kosuge | B41J 3/4075 |
| 2020/0398595 | A1 | 12/2020 | Yanagisawa et al. | |
| 2022/0118783 | A1 | 4/2022 | Ishimoto et al. | |

FOREIGN PATENT DOCUMENTS

| | | | | | |
|---|---|---|---|---|---|
| JP | 2007-301872 | A | | 11/2007 | |
| JP | 2020104329 | A | | 7/2020 | |
| JP | 2021146611 | A | * | 9/2021 | B41J 15/044 |

* cited by examiner

TAPE CARTRIDGE, TAPE ROLL, AND TAPE CARTRIDGE SET

The present application is based on, and claims priority from JP Application Serial Number 2022-153012, filed Sep. 26, 2022 and JP Application Serial Number 2022-036628, filed Mar. 9, 2022, the disclosures of which are hereby incorporated by reference herein in their entirety.

BACKGROUND

1. Technical Field

The present disclosure relates to a tape cartridge, a tape roll, and a tape cartridge set.

2. Related Art

In the related art, as disclosed in JP-A-2001-114456, a label tape cartridge including a label tape main body, an ink ribbon, a cartridge main body, and a lid body is known. The cartridge main body and the lid body accommodate the label tape main body in a replaceable manner with another label tape main body, and accommodate the ink ribbon in a replaceable manner with another ink ribbon.

Further, as disclosed in JP-A-2007-301872, a tape cartridge including a printing tape, an ink ribbon, and a cartridge case is known. The cartridge case accommodates the printing tape in a replaceable manner with another printing tape, and accommodates the ink ribbon in a replaceable manner with another ink ribbon.

In the tape cartridge in which the tape roll can be replaced, a plurality of types of tape rolls are prepared. For example, it is assumed that a plurality of types of tape rolls include a tape roll A in which a tape A is wound around a tape core and a tape roll B in which a tape B is wound around a tape core. In this case, when the user tries to replace the tape roll A with another tape roll A, there is a concern that the tape roll A is mistakenly replaced with the tape roll B.

SUMMARY

According to an aspect of the present disclosure, there is provided a tape cartridge which is a tape cartridge A configured to be mounted on a tape printing apparatus, including: a tape roll A including a tape A and a tape core A which is provided with a core hole and a receiving section and around which the tape A is wound; a ribbon roll including an ink ribbon and a paying-out core around which the ink ribbon is wound; and a cartridge case having a base wall portion and a core projection protruding from the base wall portion and inserted into the core hole, accommodating the tape roll A in a replaceable manner with another tape roll A, and accommodating the ribbon roll, in which the cartridge case is provided with a blocking section received by the receiving section, and the blocking section blocks insertion of the core projection into the core hole of a tape core B around which a tape B, which is different in type from the tape A, is wound and which has a shape different from that of the tape core A, by contact with the tape core B when the tape roll A is mistakenly replaced with a tape roll B included in a tape cartridge B, which is configured to be mounted on the tape printing apparatus, and including the tape B and the tape core B.

According to another aspect of the present disclosure, there is provided a tape roll which is a tape roll A included in a tape cartridge A configured to be mounted on a tape printing apparatus, in which the tape cartridge A includes the tape roll A, a ribbon roll, and a cartridge case, the tape roll A includes a tape A and a tape core A which is provided with a core hole and a receiving section and around which the tape A is wound, the ribbon roll includes an ink ribbon and a paying-out core around which the ink ribbon is wound, and the cartridge case includes a base wall portion and a core projection protruding from the base wall portion and inserted into the core hole, accommodates the tape roll A in a replaceable manner with another tape roll A, and accommodates the ribbon roll, the cartridge case is provided with a blocking section that blocks insertion of the core projection into a core hole of a tape core B around which a tape B, which is different in type from the tape A, is wound and which has a shape different from that of the tape core A, by contact with the tape core B when the tape roll A is mistakenly replaced with a tape roll B included in a tape cartridge B, which is configured to be mounted on the tape printing apparatus, and including the tape B and the tape core B, and the receiving section provided in the tape core A of the tape roll A accommodated in the cartridge case receives the blocking section.

According to still another aspect of the present disclosure, there is provided a tape cartridge set that configures a tape cartridge A configured to be mounted on a tape printing apparatus, including: a plurality of tape rolls A including a tape A and a tape core A which is provided with a core hole and a receiving section and around which the tape A is wound; a ribbon roll including an ink ribbon and a paying-out core around which the ink ribbon is wound; and a cartridge case having a base wall portion and a core projection protruding from the base wall portion and inserted into the core hole, configured to accommodate one tape roll A of the plurality of tape rolls A in a replaceable manner with another tape roll A, and configured to accommodate the ribbon roll, in which the cartridge case is provided with a blocking section received by the receiving section, and the blocking section blocks insertion of the core projection into the core hole of a tape core B around which a tape B, which is different in type from the tape A, is wound and which has a shape different from that of the tape core A, by contact with the tape core B when the tape roll A is mistakenly replaced with a tape roll B included in a tape cartridge B, which is configured to be mounted on the tape printing apparatus, and including the tape B and the tape core B.

DESCRIPTION OF EXEMPLARY EMBODIMENTS

Hereinafter, a tape cartridge 101, which is an embodiment of a tape cartridge, will be described with reference to the accompanying drawings. The tape cartridge 101 is detachably mounted on the tape printing apparatus 1. In the following, directions based on the XYZ orthogonal coordinate system illustrated in each drawing will be described. However, these directions are for convenience of explanation only and do not limit the following embodiments in any way. In addition, the number of each component is merely an example, and the following embodiments are not limited in any way.

Tape Cartridge

Figure 1:
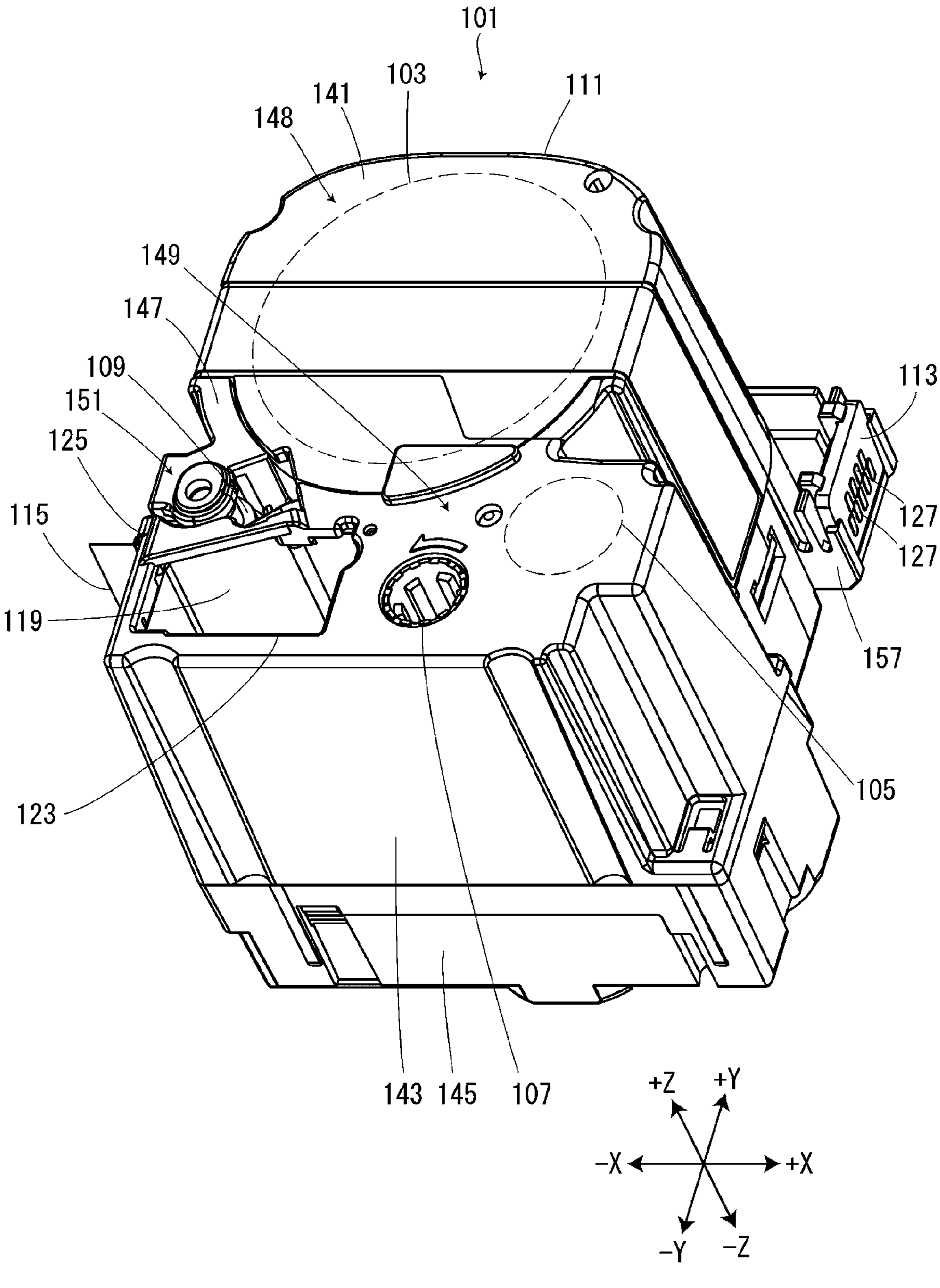
FIG. 1 is a perspective view of a tape cartridge.
Figure 2:
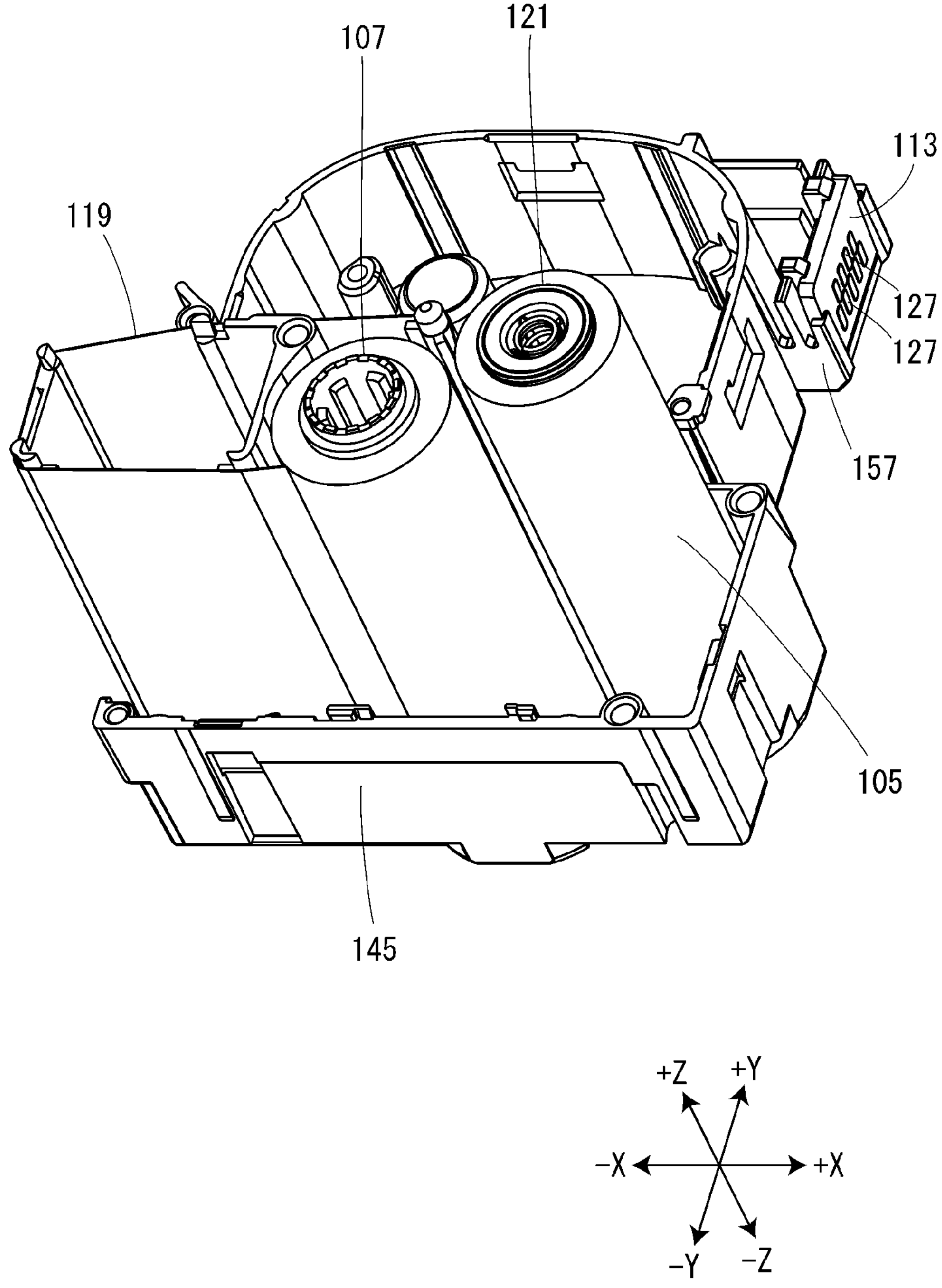
FIG. 2 is a perspective view of a third case portion in which a ribbon roll and a winding core are accommodated.

The tape cartridge 101 will be described with reference to FIGS. 1 and 2. The tape cartridge 101 includes a tape roll 103, a ribbon roll 105, a winding core 107, a platen roller 109, and a cartridge case 111 accommodating these. Further, a circuit substrate 113 is attached to the cartridge case 111.

Figure 3:
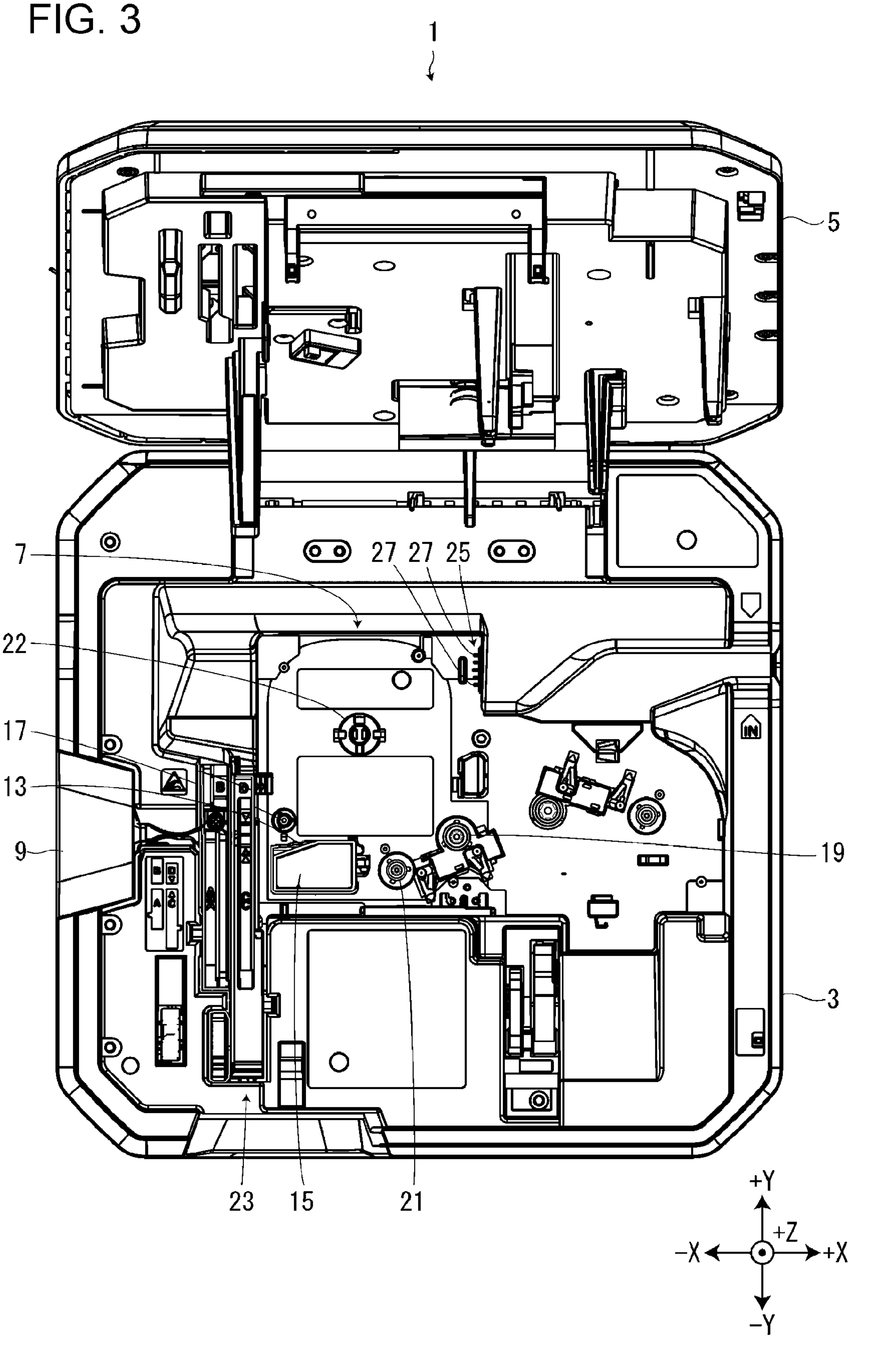
FIG. 3 is a view of the tape printing apparatus as viewed from the +Z direction.
Figure 4:
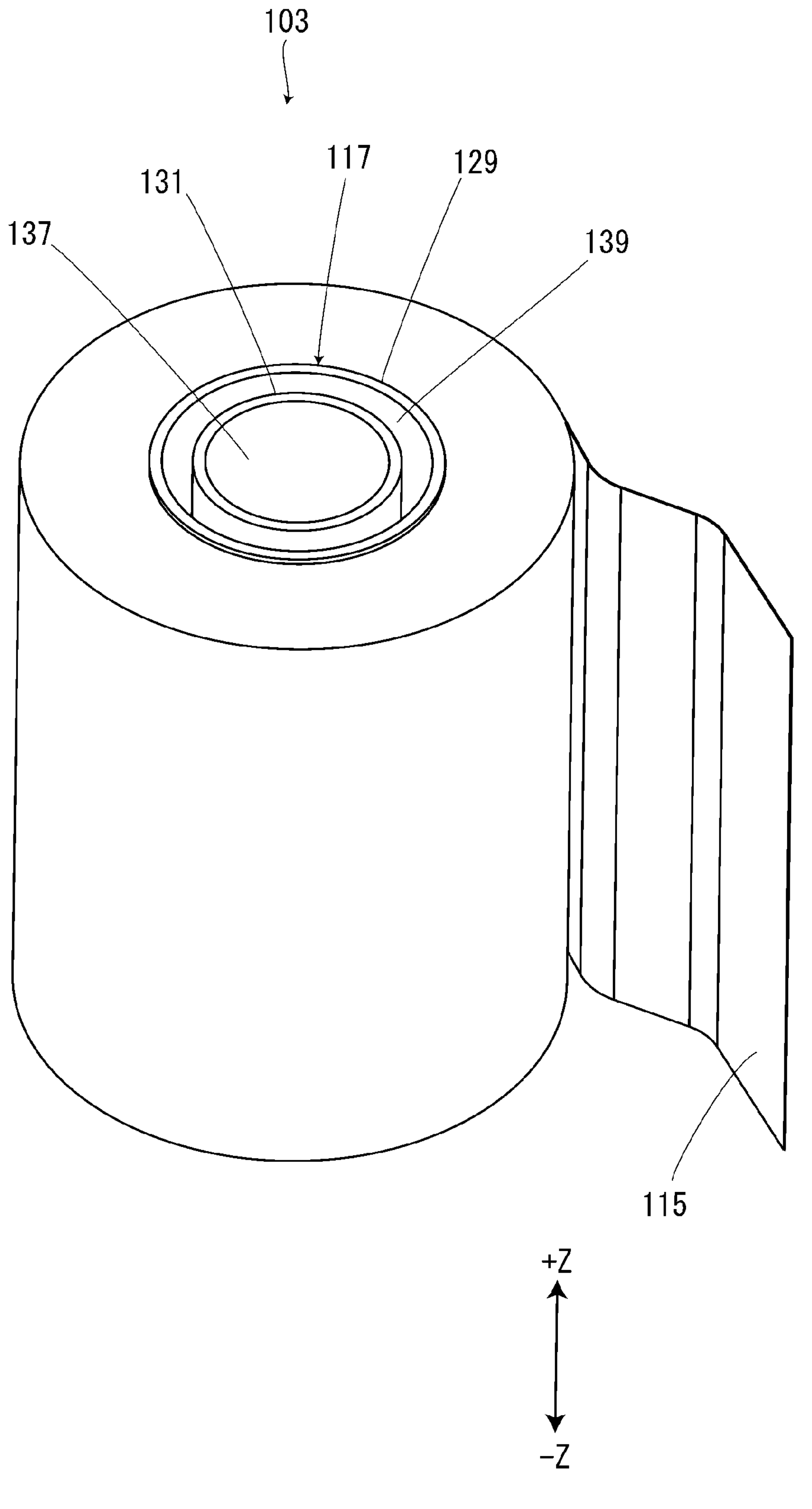
FIG. 4 is a perspective view of a tape roll.

As illustrated in FIG. 4, the tape roll 103 includes a tape 115 as a printing medium and a tape core 117 around which the tape 115 is wound. The ribbon roll 105 includes an ink ribbon 119 and a paying-out core 121 around which the ink ribbon 119 is wound. The ink ribbon 119 fed from the paying-out core 121 is wound around the winding core 107. As illustrated in FIG. 3, the platen roller 109 pinches the tape 115 and the ink ribbon 119 with a thermal head 13 provided in the tape printing apparatus 1, and feeds the pinched tape 115 and the ink ribbon 119.

In the unused tape cartridge 101, the length of the ink ribbon 119 is longer than the length of the tape 115, and when the tape 115 is made of a thick material, the length of the ink ribbon 119 is more than two times the length of the tape 115. For example, when the length of the ink ribbon 119 wound around the ribbon roll 105 is 16 m and the length of the tape 115 wound around the tape roll 103 is 3 m, the length of the ink ribbon 119 at this time is 5 rolls or more of the tape roll 103. Therefore, even when the tape roll 103 accommodated in the cartridge case 111 is in the tape end state, that is, in a state where the entire tape 115 is fed from the tape core 117, the user can continue to use the tape cartridge 101 by replacing only the tape roll 103 without replacing the ribbon roll 105.

The cartridge case 111 is provided with a head insertion hole 123 penetrating in the Z axis. Further, a tape sending port 125 extending in the Z axis is provided on the surface of the cartridge case 111 in the −X direction. From the tape sending port 125, the tape 115 fed from the tape roll 103 is sent out of the cartridge case 111.

The circuit substrate 113 is provided at the end portions in the +Y direction and the −Z direction on the surface of the cartridge case 111 in the +X direction. The circuit substrate 113 includes a plurality of electrode portions 127 and storage elements (not illustrated). Various pieces of information are stored in the storage element. Examples of the various pieces of information include information indicating the color of the tape 115, information indicating the width of the tape 115, information indicating the material of the tape 115, information indicating the color of the ink ribbon 119, and information indicating the remaining amount of the ink ribbon 119, that is, the length of the ink ribbon 119 wound around the paying-out core 121. Examples of the information indicating the remaining amount of the ink ribbon 119 include information indicating the length of the ink ribbon 119 in the unused tape cartridge 101 and information indicating the length of the ink ribbon 119 consumed, that is, fed from the paying-out core 121.

Tape Printing Apparatus

The tape printing apparatus 1 will be described with reference to FIG. 3. The tape printing apparatus 1 includes an apparatus case 3 and a mounting section cover 5. The apparatus case 3 is formed in a substantially rectangular shape. A cartridge mounting section 7 is provided on a surface of the apparatus case 3 in the +Z direction. The cartridge mounting section 7 is a recess portion that is open in the +Z direction. The tape cartridge 101 is detachably mounted on the cartridge mounting section 7.

A tape discharge port 9 is provided on a surface of the apparatus case 3 in the −X direction. The tape 115 sent out of the tape cartridge 101 mounted on the cartridge mounting section 7 is discharged from the tape discharge port 9.

The mounting section cover 5 is turnably attached to the end portion of the apparatus case 3 in the +Y direction. The mounting section cover 5 opens and closes the cartridge mounting section 7.

The cartridge mounting section 7 is provided with the thermal head 13 and a head cover 15. The thermal head 13 includes a heat generating element (not illustrated) and performs printing on the tape 115. The head cover 15 partially covers the thermal head 13. When the tape cartridge 101 is mounted on the cartridge mounting section 7, the thermal head 13 and the head cover 15 are inserted into the head insertion hole 123.

From the bottom surface of the cartridge mounting section 7, the platen shaft 17, a paying-out shaft 19, and a winding shaft 21 protrude in the +Z direction. When the tape cartridge 101 is mounted on the cartridge mounting section 7, the platen shaft 17, the paying-out shaft 19, and the winding shaft 21 are inserted into the platen roller 109, the paying-out core 121, and the winding core 107, respectively. As a result, the rotation of the feed motor (not illustrated) can be transmitted to the platen roller 109, the paying-out core 121, and the winding core 107. Further, an insertion projection 22 protrudes from the bottom surface of the cartridge mounting section 7 in the +Z direction. When the tape cartridge 101 is mounted on the cartridge mounting section 7, the insertion projection 22 is inserted into a third core projection 159, which will be described later, illustrated in FIG. 11.

When the mounting section cover 5 is closed after the tape cartridge 101 is mounted on the cartridge mounting section 7, the thermal head 13 moves toward the platen roller 109 by a head moving mechanism (not illustrated). As a result, the tape 115 and the ink ribbon 119 are pinched between the thermal head 13 and the platen roller 109. When the platen roller 109 rotates in this state, the tape 115 and the ink ribbon 119 are fed. At this time, the thermal head 13 generates heat based on the print data received from an external apparatus such as a personal computer, and accordingly, the ink of the ink ribbon 119 is transferred to the tape 115 and the printed image is printed on the tape 115.

A cutter 23 is provided between the cartridge mounting section 7 and the tape discharge port 9. The cutter 23 cuts the tape 115 using a cutter motor (not illustrated) as a driving source. As a result, the printed part of the tape 115 is separated.

A substrate coupling section 25 is provided on the inner surface of the cartridge mounting section 7. The substrate coupling section 25 includes a plurality of contact terminal portions 27. The plurality of contact terminal portions 27 are in contact with the plurality of electrode portions 127 provided on the circuit substrate 113 of the tape cartridge 101 mounted on the cartridge mounting section 7. As a result, the circuit substrate 113 and a control section (not illustrated) included in the tape printing apparatus 1 are electrically coupled to each other via the substrate coupling section 25. The control section includes a processor and various types of memory, and controls each section of the tape printing apparatus 1. The control section reads various pieces of information stored in the circuit substrate 113 and writes various pieces of information in the circuit substrate 113 via the substrate coupling section 25.

When the control section receives the instruction to execute printing, the control section determines whether or not the printing length exceeds the remaining amount of the ink ribbon 119 based on the information indicating the remaining amount of the ink ribbon 119 read from the circuit substrate 113 and the printing length based on the print data, before starting the printing processing. That is, the control section determines whether or not the printing length exceeds the remaining amount of the ink ribbon 119, before the tape printing apparatus 1 starts feeding the tape 115 and the ink ribbon 119. When the control section determines that the printing length exceeds the remaining amount of the ink ribbon 119, the control section stops the printing processing and causes a notification section such as a display provided in the tape printing apparatus 1 or the external apparatus to notify that effect. In this manner, since the information indicating the remaining amount of the ink ribbon 119 is stored in the circuit substrate 113, it is possible to avoid a state where the ink ribbon 119 is used up in advance during printing. Further, after the printing operation is ended, the control section rewrites the information stored in the circuit substrate 113, that is, the information indicating the length of the consumed ink ribbon 119, based on the printing length indicated by the print data.

Tape Core

Figure 5:
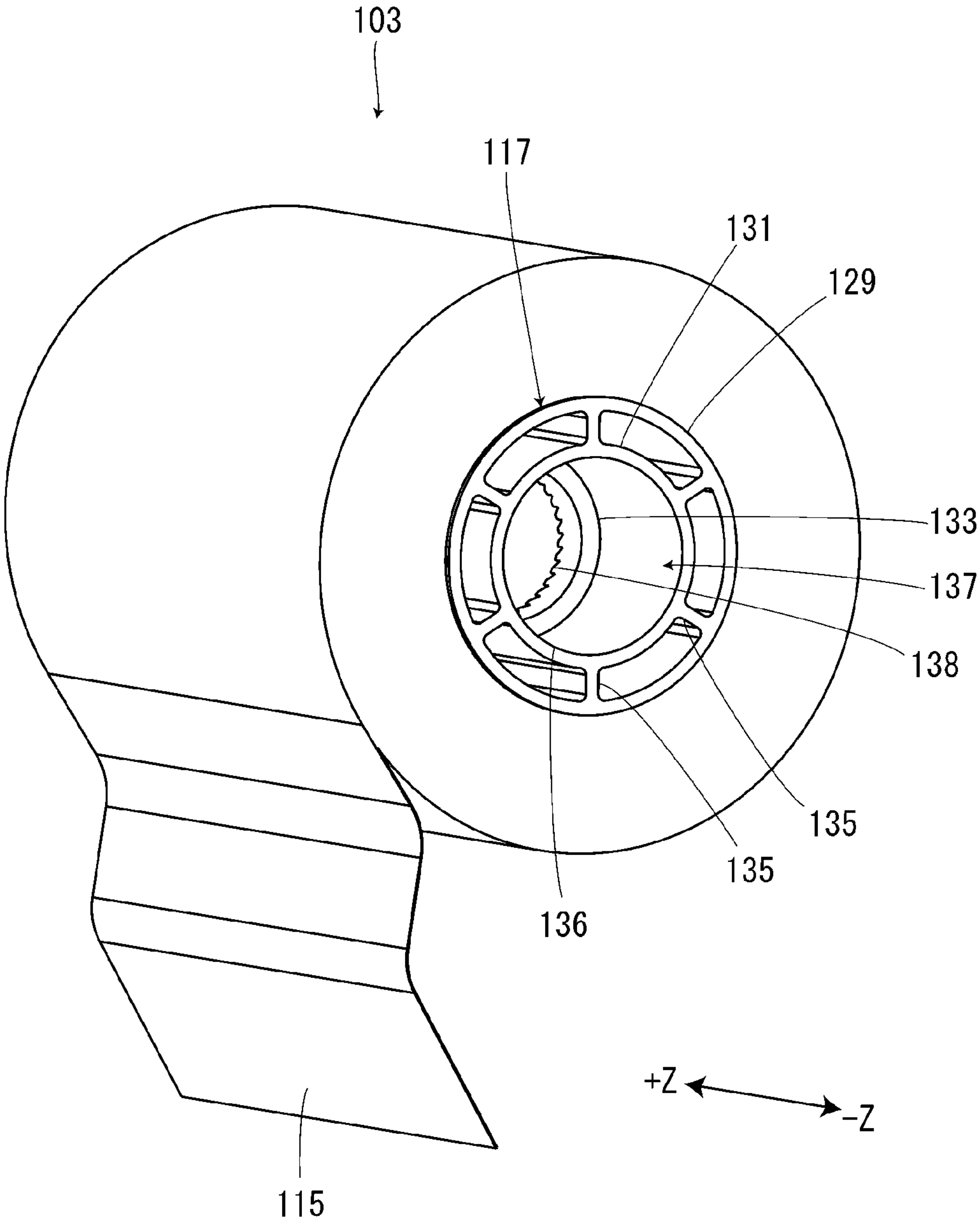
FIG. 5 is a perspective view of the tape roll when viewed from an angle different from that in FIG. 4.

The tape core 117 will be described with reference to FIGS. 4 and 5. As will be described later, there are two types of tape core 117, a tape core 117A illustrated in FIG. 12 and a tape core 117B illustrated in FIG. 13. However, hereinafter, the common points of the tape core 117A and the tape core 117B will be described without distinguishing between the two types, and the differences between the tape core 117A and the tape core 117B will be described later.

The tape core 117 is formed in a substantially cylindrical shape. The tape core 117 includes an outer tube portion 129, an inner tube portion 131, a core hole rib portion 133, and a plurality of coupling rib portions 135. The outer tube portion 129, the inner tube portion 131, the core hole rib portion 133, and the plurality of coupling rib portions 135 are integrally formed of a resin.

Figure 11:
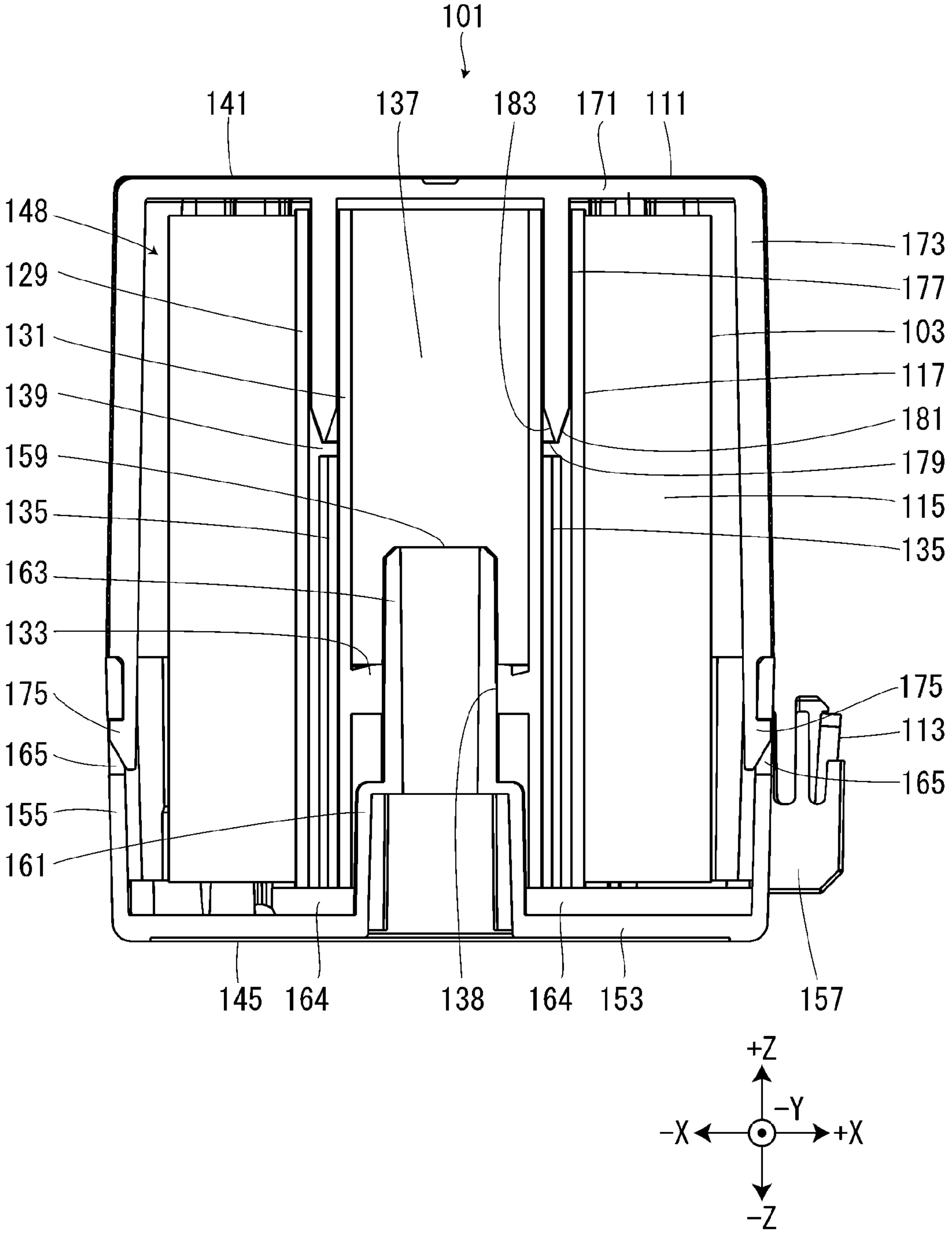
FIG. 11 is a sectional view of the tape cartridge after the mounting of the first case portion on the third case portion is completed.

The outer tube portion 129 is formed in a substantially cylindrical shape. The tape 115 is wound around the outer peripheral surface of the outer tube portion 129. The inner tube portion 131 is formed in a cylindrical shape having a diameter smaller than that of the outer tube portion 129, and is provided inside the outer tube portion 129. That is, the tape core 117 has a double-cylinder structure including an outer tube portion 129 and an inner tube portion 131. The inside of the inner tube portion 131 functions as a core hole 137 into which the third core projection 159, which will be described later, will be inserted, as illustrated in FIG. 11. In addition, the end portion of the core hole 137 in the −Z direction is referred to as a projection insertion port 136.

The core hole rib portion 133 is provided inside the inner tube portion 131, that is, in the core hole 137, and is formed in a substantially disk shape perpendicular to the central axis direction, that is, the Z axis of the inner tube portion 131. A projection insertion opening 138 is provided at the center of the core hole rib portion 133. The projection insertion opening 138 is formed in a substantially circular shape. As illustrated in FIG. 11, a second projection portion 163 of the third core projection 159 is inserted into the projection insertion opening 138.

Figure 8:
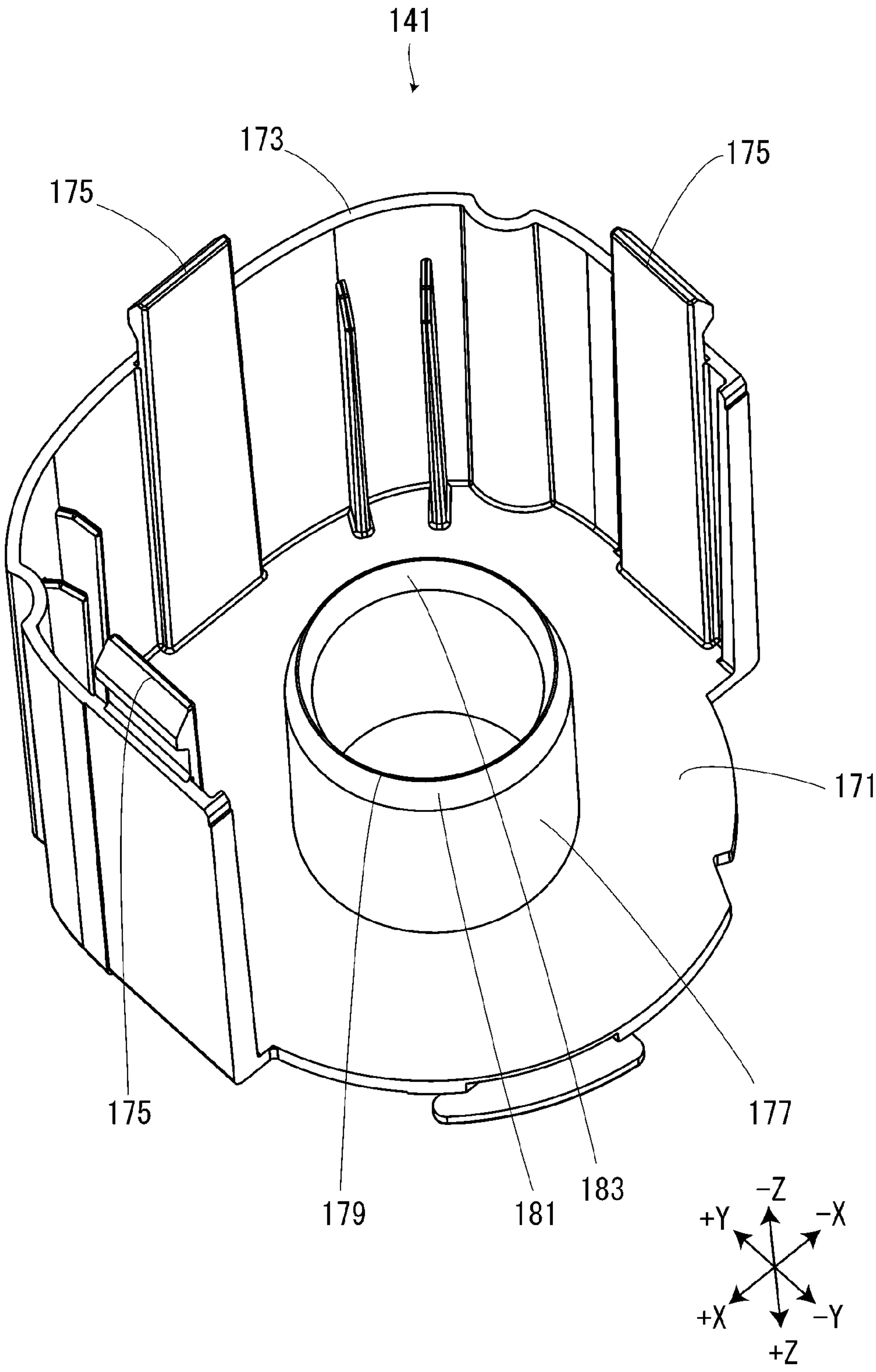
FIG. 8 is a perspective view of the first case portion.

The plurality of coupling rib portions 135 are coupled between the outer tube portion 129 and the inner tube portion 131 in the radial direction of the outer tube portion 129 and the inner tube portion 131, and are provided radially with respect to the central axis of the outer tube portion 129 and the inner tube portion 131. The coupling rib portion 135 is not provided at a part of a region in the +Z direction between the outer tube portion 129 and the inner tube portion 131, for example, approximately ⅓ of the region in the +Z direction, and the region is a substantially cylindrical space. This substantially cylindrical space functions as an insertion receiving section 139 into which the first core projection 177, which will be described later, will be inserted, as illustrated in FIG. 8. The insertion receiving section 139 is provided on the radially outer side of the tape core 117 with respect to the core hole 137.

Cartridge Case

The cartridge case 111 will be described with reference to FIG. 1. The cartridge case 111 includes a first case portion 141, a second case portion 143, a third case portion 145, and a fourth case portion 147. The first case portion 141, the second case portion 143, and the fourth case portion 147 are positioned in the +Z direction in the cartridge case 111, and the third case portion 145 is positioned in the −Z direction in the cartridge case 111. The tape cartridge 101 is mounted on the cartridge mounting section 7 such that the third case portion 145 faces the bottom surface of the cartridge mounting section 7.

The first case portion 141, the second case portion 143, the third case portion 145, and the fourth case portion 147 are bodies separated from each other. The first case portion 141, the second case portion 143, and the fourth case portion 147 are made of a translucent resin, and the third case portion 145 is made of a non-translucent resin. However, the materials of the first case portion 141, the second case portion 143, the third case portion 145, and the fourth case portion 147 are not limited thereto.

As illustrated in FIG. 11, the first case portion 141 accommodates the tape roll 103 between the first case portion 141 and the third case portion 145. That is, the first case portion 141 and the third case portion 145 form the outer shell of a tape roll accommodation section 148 in which the tape roll 103 is accommodated. The user can close the tape roll accommodation section 148 by mounting the first case portion 141 on the third case portion 145, and by removing the first case portion 141 from the third case portion 145, the tape roll accommodation section 148 can be opened.

The second case portion 143 is provided in the −Y direction with respect to the first case portion 141. The second case portion 143 accommodates the ribbon roll 105 and the winding core 107 between the second case portion 143 and the third case portion 145. That is, the second case portion 143 and the third case portion 145 form the outer shell of an ink ribbon accommodation section 149 in which the ribbon roll 105 and the winding core 107 are accommodated.

The fourth case portion 147 is provided between the first case portion 141 and the second case portion 143 at the end portion of the cartridge case 111 in the −X direction. The fourth case portion 147 and the third case portion 145 accommodate the platen roller 109. That is, the third case portion 145 and the fourth case portion 147 form the outer shell of the platen roller accommodation section 151 in which the platen roller 109 is accommodated.

Figure 7:
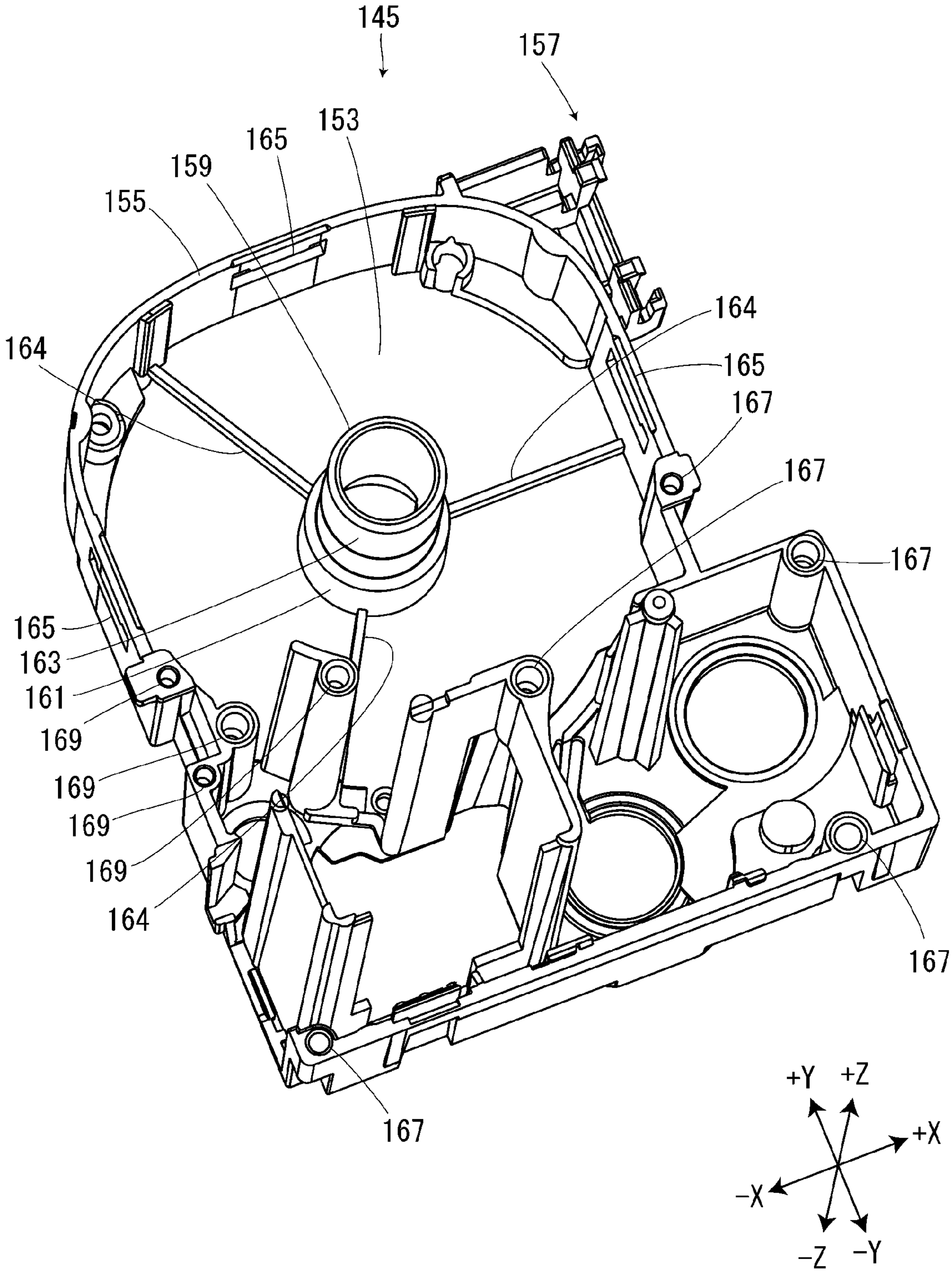
FIG. 7 is a perspective view of a third case portion.

In the second case portion 143, a second engaging pin (not illustrated) provided in the second case portion 143 is press-fitted into a third A engaging hole 167 provided in the third case portion 145 as illustrated in FIG. 7, and accordingly, the second case portion 143 and the third case portion 145 are combined with each other. Therefore, the user can remove the second case portion 143 from the third case portion 145 by using a predetermined cartridge disassembling device, but it is difficult to manually remove the second case portion 143 from the third case portion 145.

Similarly, a fourth engaging pin (not illustrated) provided in the fourth case portion 147 is press-fitted into a third B engaging hole 169 provided in the third case portion 145 as illustrated in FIG. 7, and accordingly, the fourth case portion 147 and the third case portion 145 are combined with each other. Therefore, the user can remove the fourth case portion 147 from the third case portion 145 by using a predetermined cartridge disassembling device, but it is difficult to manually remove the fourth case portion 147 from the third case portion 145.

Figure 6:
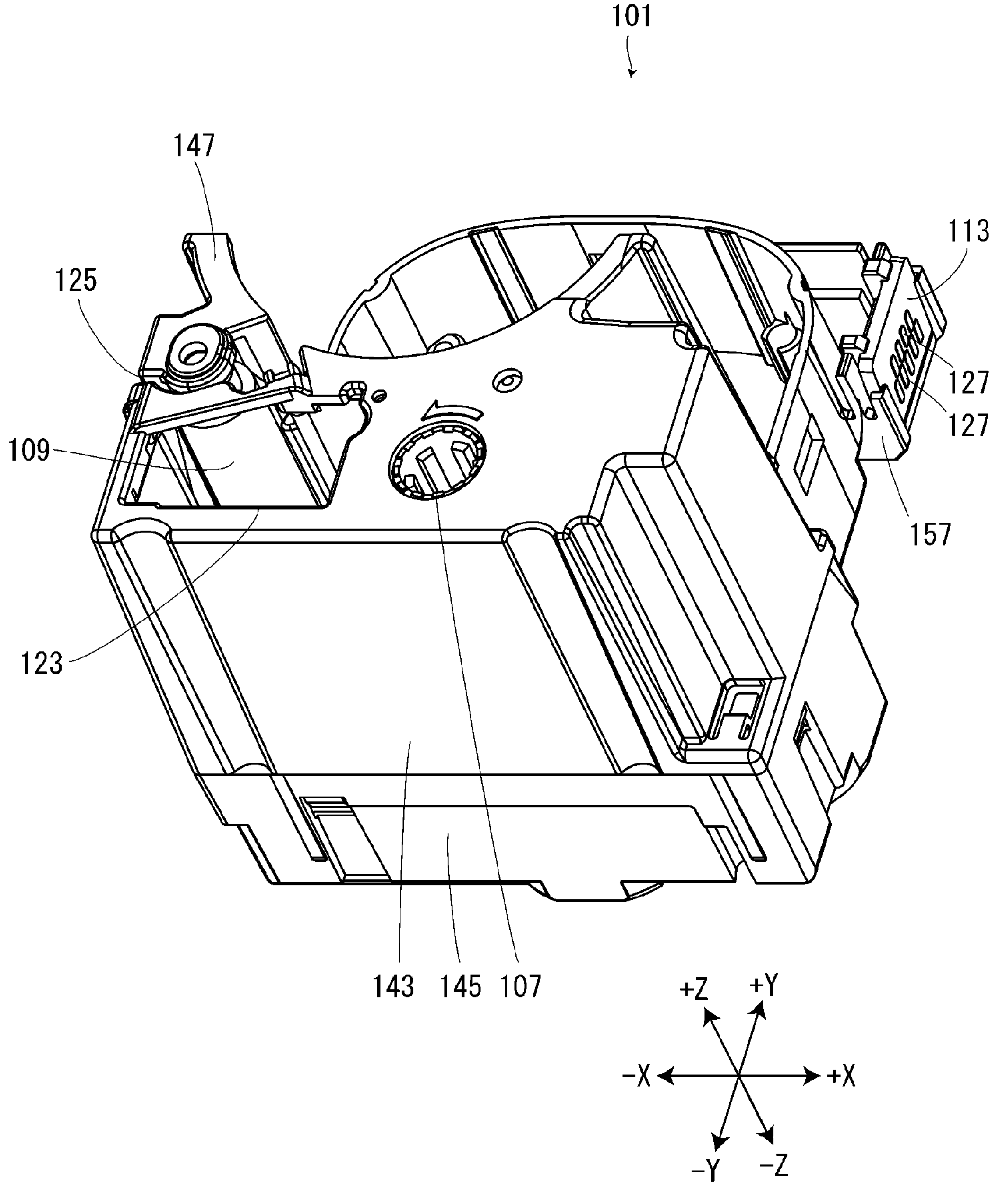
FIG. 6 is a perspective view of a tape cartridge from which the first case portion was removed.

In response to these, as will be described later, three first engaging protrusion portions 175 provided in the first case portion 141 as illustrated in FIG. 8 are engaged with three third engagement receiving sections 165 provided in the third case portion 145 as illustrated in FIG. 7, and accordingly, the first case portion 141 is mounted on the third case portion 145. Therefore, as illustrated in FIG. 6, the user can easily remove the first case portion 141 from the third case portion 145 manually without using the cartridge disassembling device. At this time, the second case portion 143 and the fourth case portion 147 are still combined with the third case portion 145. In addition, FIG. 6 illustrates a state where the tape core 117 is removed from the cartridge case 111 after the first case portion 141 is removed. In addition, for the sake of illustration, the ink ribbon 119 is omitted in FIG. 6.

In the tape cartridge 101, when the user replaces the tape roll 103 with another tape roll 103, the user first removes the first case portion 141 from the third case portion 145 and takes out the tape roll 103 from the cartridge case 111. Subsequently, the user places another tape roll 103 in the third case portion 145. Subsequently, the user mounts the first case portion 141 to the third case portion 145, and ends the replacement work of the tape roll 103.

Third Case Portion

The third case portion 145 will be described with reference to FIG. 7. Further, as will be described later, there are two types of the third case portion 145, the third case portion 145A illustrated in FIG. 12 and the third case portion 145B illustrated in FIG. 13. However, hereinafter, the common points of the third case portion 145A and the third case portion 145B will be described without distinguishing between the two types, and the differences between the third case portion 145A and the third case portion 145B will be described later.

The third case portion 145 includes a third base wall portion 153, a third side wall portion 155 protruding in the +Z direction from the peripheral edge portion of the third base wall portion 153, and a substrate attaching section 157 provided on the outside of the third side wall portion 155.

The third base wall portion 153 is formed in a plate shape parallel to the XY plane. The third core projection 159 protrudes from the third base wall portion 153 in the +Z direction. The third core projection 159 is formed in a substantially stepped cylindrical shape, and the insertion projection 22 described above is inserted into the third core projection 159. The third core projection 159 includes a first projection portion 161 and the second projection portion 163. The first projection portion 161 is provided on the proximal end side of the third core projection 159, that is, in the −Z direction. The second projection portion 163 is provided on the tip end side of the third core projection 159, that is, in the +Z direction. The diameter of the second projection portion 163 is smaller than that of the first projection portion 161 and slightly smaller than that of the projection insertion opening 138 illustrated in FIG. 11. The third core projection 159 is inserted into the core hole 137 of the tape core 117 from the projection insertion port 136, that is, from the −Z direction. At this time, the second projection portion 163 is inserted into the projection insertion opening 138. The third core projection 159 rotatably supports the tape roll 103 together with the first core projection 177 which will be described later.

In addition, three third base rib portions 164 are provided on the surface of the third base wall portion 153 in the +Z direction. The three third base rib portions 164 are provided radially with respect to the third core projection 159. That is, the three third base rib portions 164 extend linearly in the radial direction of the third core projection 159. The protrusion heights of the three third base rib portions 164 are lower than the protrusion heights of the first projection portions 161 of the third core projections 159. The three third base rib portions 164 impart rigidity to the third base wall portion 153. Further, in a state where the tape roll 103 is placed on the third base wall portion 153, the end surface of the tape core 117 in the −Z direction is separated from the surface of the third base wall portion 153 in the +Z direction by the three third base rib portions 164, and is in contact with the surfaces of the three third base rib portions 164 in the +Z direction, as illustrated in FIG. 11.

The substrate attaching section 157 is positioned at the end portion in the +X direction and the +Y direction in the third case portion 145, and is provided on the outside of the third side wall portion 155. The circuit substrate 113 is attached to the substrate attaching section 157.

The third case portion 145 is provided with three third engagement receiving sections 165, five third A engaging holes 167, and four third B engaging holes 169.

The three third engagement receiving sections 165 are provided on the third side wall portion 155 corresponding to the positions where the first case portion 141 is combined with the third case portion 145. The three third engagement receiving sections 165 are disengageably engaged with the three first engaging protrusion portions 175 provided in the first case portion 141. As a result, the first case portion 141 is detachably mounted on the third case portion 145.

The five third A engaging holes 167 are provided on the third side wall portion 155 or the like corresponding to the positions where the second case portion 143 is combined with the third case portion 145. The five second engaging pins provided in the second case portion 143 are press-fitted into the five third A engaging holes 167 from the +Z direction. As a result, the second case portion 143 is combined with the third case portion 145.

The four third B engaging holes 169 are provided on the third side wall portion 155 or the like corresponding to the positions where the fourth case portion 147 is combined with the third case portion 145. The four fourth engaging pins provided in the fourth case portion 147 are press-fitted into the four third B engaging holes 169 from the +Z direction. As a result, the fourth case portion 147 is combined with the third case portion 145.

First Case Portion

Figure 9:
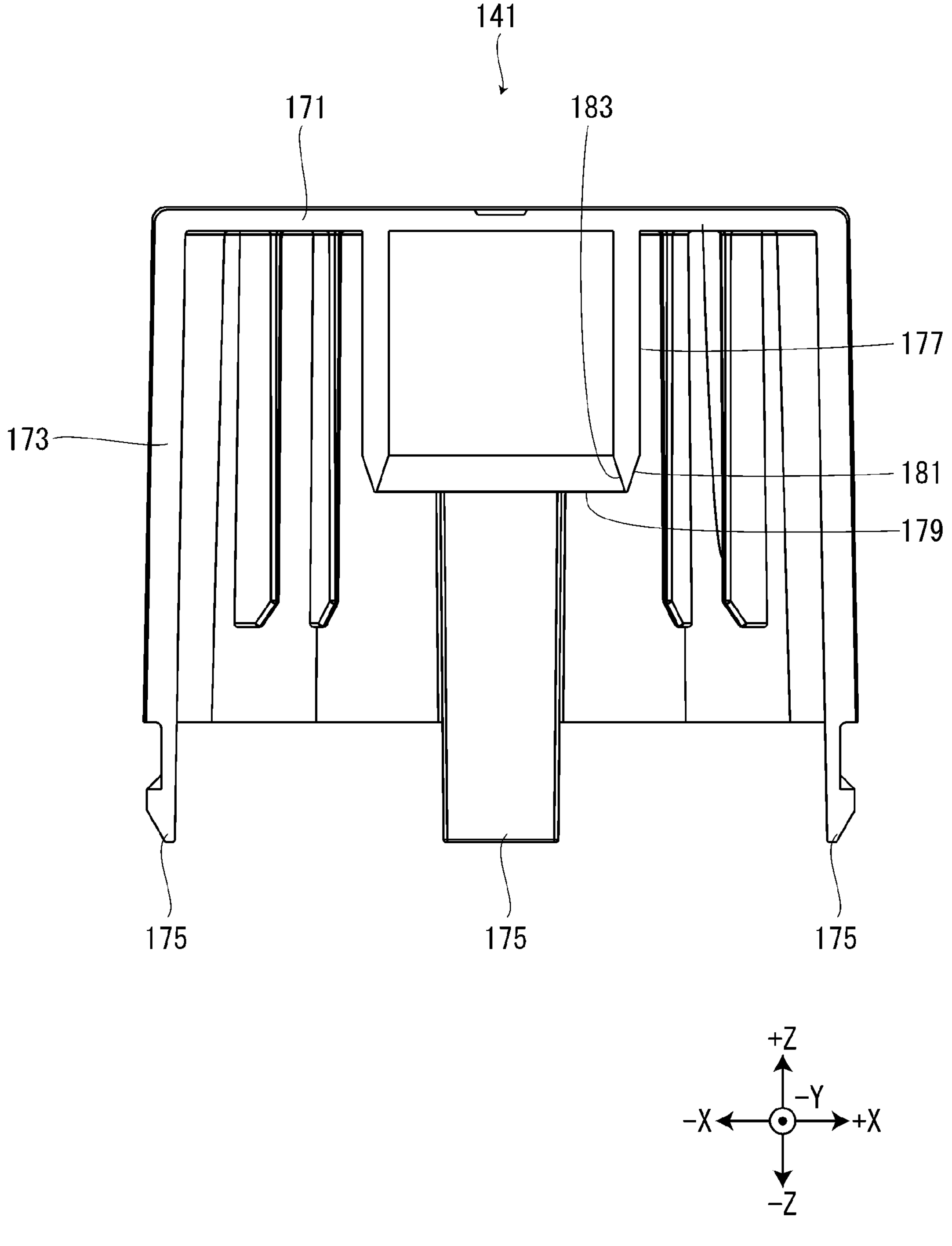
FIG. 9 is a sectional view of the first case portion.

The first case portion 141 will be described with reference to FIGS. 8 and 9. The first case portion 141 includes a first base wall portion 171 and a first side wall portion 173 protruding in the −Z direction from a peripheral edge portion of the first base wall portion 171.

The first case portion 141 is provided with three first engaging protrusion portions 175. The three first engaging protrusion portions 175 protrude from the first side wall portion 173 in the −Z direction. The three first engaging protrusion portions 175 are disengageably engaged with the three third engagement receiving sections 165 provided in the third case portion 145. As a result, the first case portion 141 is detachably mounted on the third case portion 145.

Figure 10:
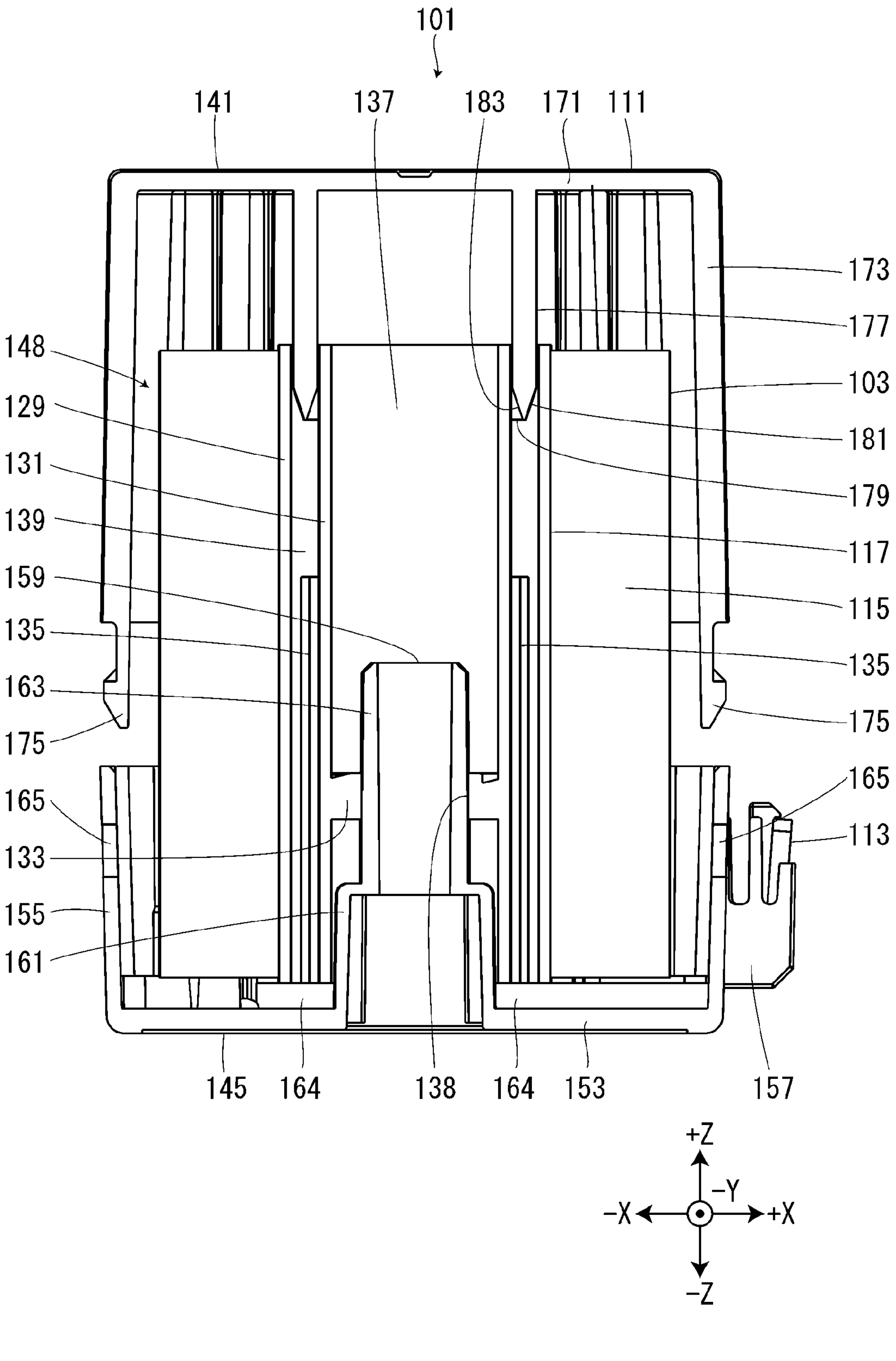
FIG. 10 is a sectional view of a tape cartridge during mounting of the first case portion on the third case portion.

The first base wall portion 171 is positioned in the +Z direction with respect to the third base wall portion 153 when the first case portion 141 is mounted on the third case portion 145, and is formed in a plate shape parallel to the XY plane. The first core projection 177 protrudes from the first base wall portion 171 in the −Z direction. The first core projection 177 is formed in a substantially cylindrical shape. As illustrated in FIG. 10, the thickness of the first core projection 177, that is, the difference between the outer diameter and the inner diameter of the first core projection 177 is slightly smaller than the width of the insertion receiving section 139 provided in the tape core 117, that is, the difference between the inner diameter of the outer tube portion 129 and the outer diameter of the inner tube portion 131.

As illustrated in FIG. 10, the first core projection 177 is inserted into the insertion receiving section 139 provided in the tape core 117 from the +Z direction. The first core projection 177 rotatably supports the tape roll 103 together with the third core projection 159 described above.

As described above, since the tape roll 103 is rotatably supported by the first core projection 177 inserted into the insertion receiving section 139, compared to the configuration in which the first core projection 177 is inserted into the core hole 137, the tape roll 103 is supported by the first core projection 177 at a position farther from the rotation axis of the tape roll 103. Therefore, when the user replaces the tape roll 103 or the like, shaking of the rotation axis of the tape roll 103 is suppressed, and the travelability of the tape 115 can be stabilized. Further, it is conceivable to increase the diameters of the outer tube portion 129 and the inner tube portion 131 such that the inside of the inner tube portion 131, that is, the core hole 137 functions as the insertion receiving section 139. However, in this case, the length of the tape 115 that can be wound around the tape roll 103 is shortened.

Type of Tape Cartridge

A plurality of types of tape cartridges 101 are prepared. Among the plurality of types of tape cartridges 101, a tape cartridge 101A illustrated in FIG. 12 and a tape cartridge 101B illustrated in FIG. 13 are included.

The tape 115, the ink ribbon 119, the tape core 117, and the third case portion 145 are different between the tape cartridge 101A and the tape cartridge 101B. Therefore, the tape 115, the ink ribbon 119, the tape core 117, and the third case portion 145 included in the tape cartridge 101A are referred to as a tape 115A, an ink ribbon 119A, the tape core 117A, and the third case portion 145A. Further, the tape roll 103 provided with the tape 115A and the tape core 117A is referred to as a tape roll A. Similarly, the tape 115, the ink ribbon 119, the tape core 117, and the third case portion 145 included in the tape cartridge 101B are referred to as a tape 115B, an ink ribbon 119B, the tape core 117B, and the third case portion 145B. Further, the tape roll 103 provided with the tape 115B and the tape core 117B is referred to as a tape roll B. In addition, when it is not necessary to distinguish between the tape cartridge 101A and the tape cartridge 101B, the tape cartridge 101A and the tape cartridge 101B are simply referred to as a tape cartridge 101. The same applies to the other components designated by reference numerals A and B.

The tape 115A and the tape 115B are used for different purposes, and differ in shape, material, and the like. For example, the tape 115A is composed of a polyethylene terephthalate (PET) printing tape formed in a long strip shape and a release paper attached to an adhesive surface of the printing tape, and is attached to a notebook, a file, or the like. For example, the tape 115B is made of a heat-shrinkable material formed in a tube shape, and is attached to the outer peripheral surface of the tape 115B as a cable or the like is inserted thereinto and further heated with hot air or the like.

The ink ribbon 119A has characteristics suitable for printing on the tape 115A, and the ink ribbon 119B has characteristics suitable for printing on the tape 115B. In other words, the ink ribbon 119A is not suitable for printing on the tape 115B, and the ink ribbon 119B is not suitable for printing on the tape 115A. The appropriateness of printing is evaluated from, for example, the image density of the printed image, the durability of the printed image, and the like.

First Embodiment of Tape Core and Third Case Portion

A first embodiment of the tape core 117A, the tape core 117B, the third case portion 145A, and the third case portion 145B will be described with reference to FIGS. 12 to 15.

Figure 12:
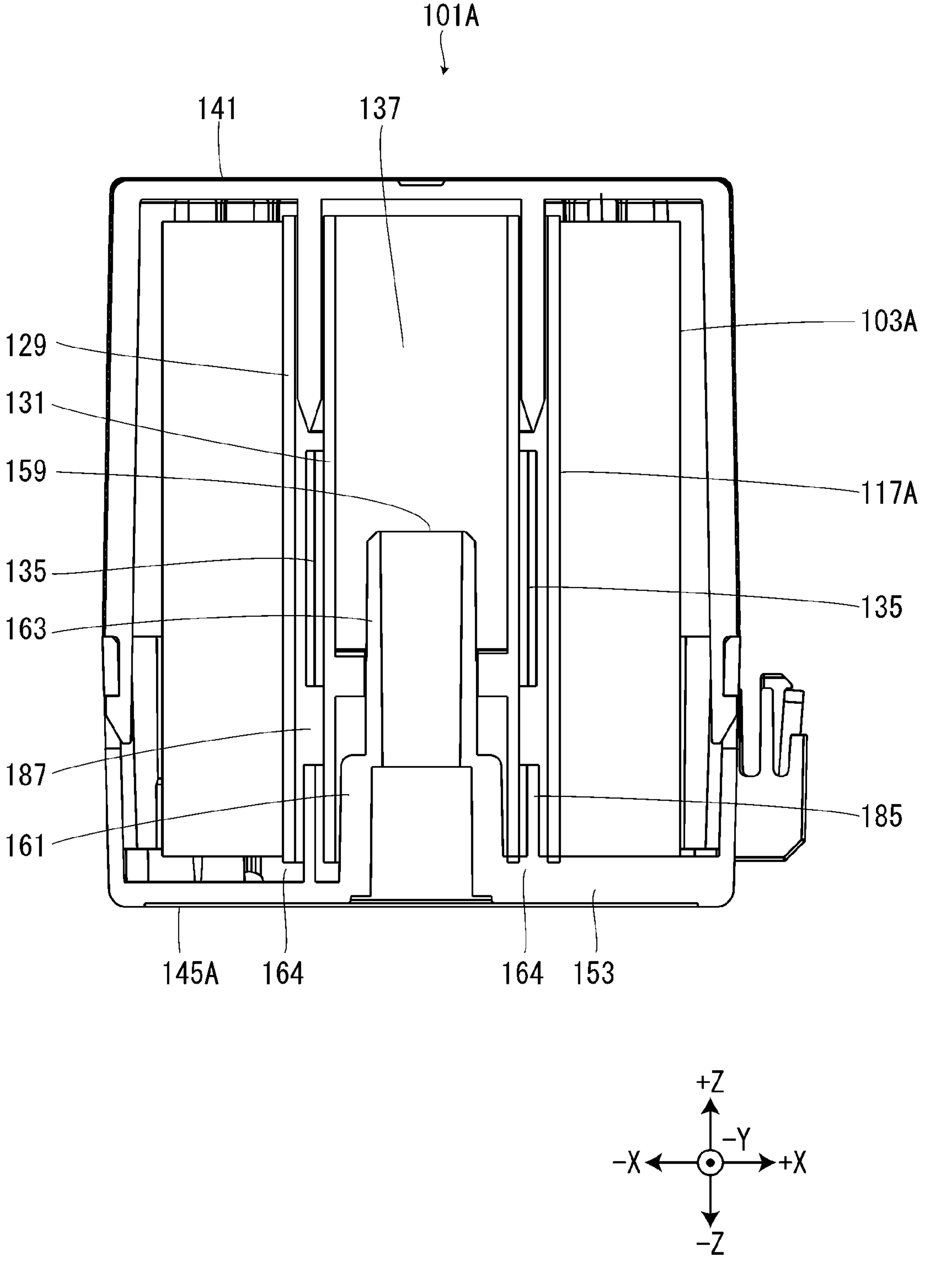
FIG. 12 is a sectional view illustrating a tape cartridge A of a first embodiment.
Figure 13:
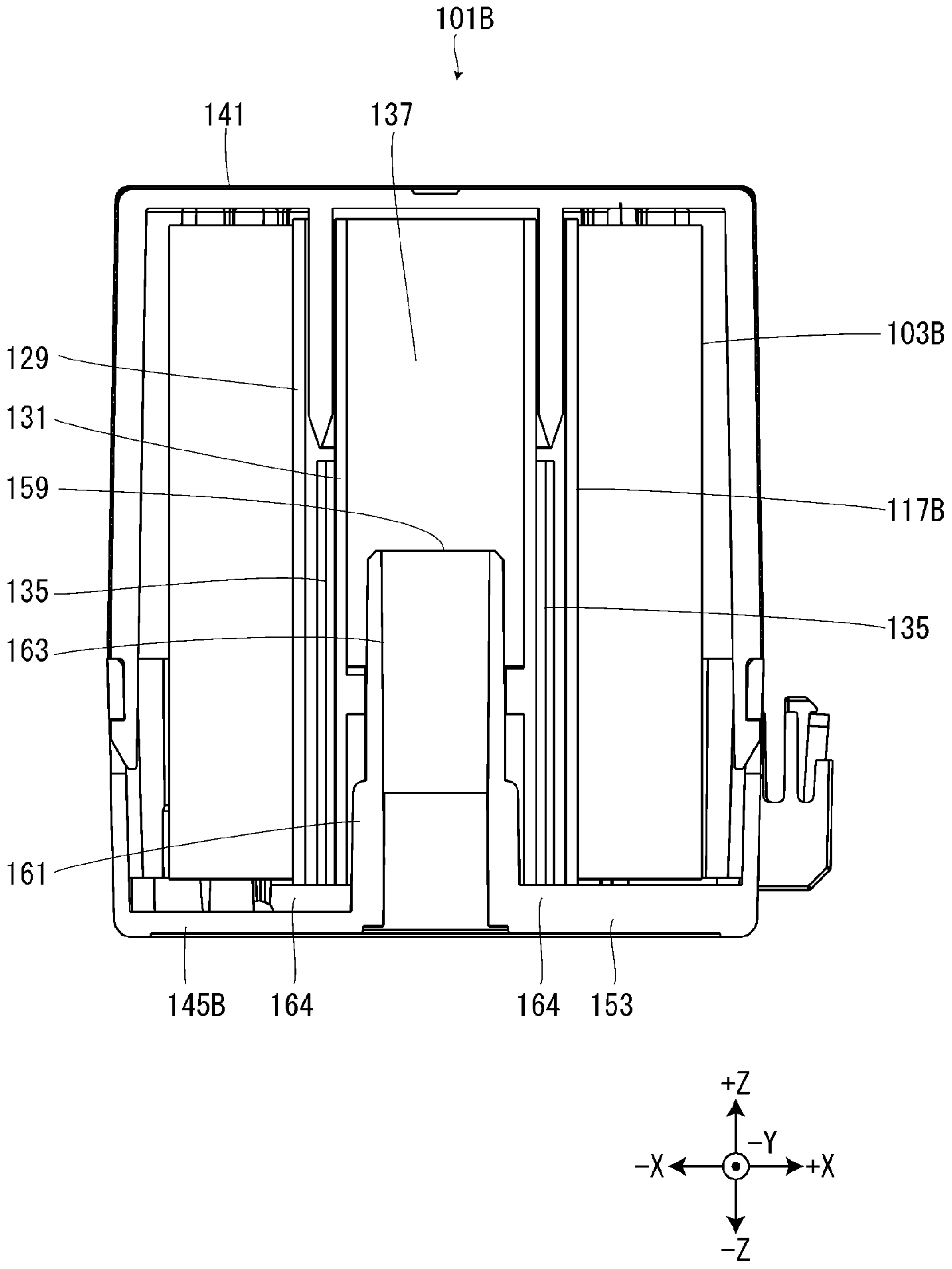
FIG. 13 is a sectional view illustrating a tape cartridge B of the first embodiment.

The tape core 117A and the tape core 117B of the first embodiment are different from each other in that the tape core 117A illustrated in FIG. 12 is provided with an outer recess portion 187 received by an outer protrusion portion 185 which will be described later, whereas the tape core 117B illustrated in FIG. 13 is not provided with the outer recess portion 187.

In the tape core 117A, as illustrated in FIG. 12, a plurality of coupling rib portions 135 extend in the Z axis between the outer tube portion 129 and the inner tube portion 131 in a region of an intermediate portion in the Z axis, for example, a region which is approximately ⅓ of an intermediate portion in the Z axis. Therefore, the coupling rib portion 135 is not provided at a part of a region in the −Z direction between the outer tube portion 129 and the inner tube portion 131, for example, approximately ⅓ of the region in the −Z direction, and the region is a substantially cylindrical space. This substantially cylindrical space functions as the outer recess portion 187. The outer recess portion 187 is provided on the radially outer side of the tape core 117A with respect to the core hole 137.

Meanwhile, in the tape core 117B, as illustrated in FIG. 13, the plurality of coupling rib portions 135 extend in the Z axis between the outer tube portion 129 and the inner tube portion 131 at a part of a region in the −z direction, for example, a region which is approximately ⅔ in the −Z direction. That is, the plurality of coupling rib portions 135 extend to the end portions of the outer tube portion 129 and the inner tube portion 131 in the −Z direction. Therefore, unlike the tape core 117A, the outer recess portion 187 is not provided at a part of the region between the outer tube portion 129 and the inner tube portion 131 in the −Z direction. Instead, the plurality of coupling rib portions 135 are present.

In addition, the third case portion 145A and the third case portion 145B of the first embodiment are different from each other in that the third case portion 145A illustrated in FIG. 12 is provided with an outer protrusion portion 185 received by the outer recess portion 187 described above, whereas the third case portion 145B illustrated in FIG. 13 is not provided with the outer protrusion portion 185.

The third case portion 145A is provided with the outer protrusion portion 185 that is positioned on the radially outer side of the third core projection 159 and protrudes from the third base wall portion 153 in the +Z direction. The outer protrusion portion 185 is formed in a substantially cylindrical shape concentric with the third core projection 159. The thickness of the outer protrusion portion 185, that is, the difference between the outer diameter and the inner diameter of the outer protrusion portion 185 is smaller than the width of the outer recess portion 187 provided in the tape core 117A, that is, the difference between the inner diameter of the outer tube portion 129 and the outer diameter of the inner tube portion 131.

Further, a substantially cylindrical space is provided between the outer protrusion portion 185 and the first projection portion 161 of the third core projection 159. The width of this substantially cylindrical space is larger than the thickness of the inner tube portion 131 of the tape core 117A. When the third core projection 159 is inserted into the core hole 137 of the tape core 117A, the outer protrusion portion 185 is inserted into the outer recess portion 187, and the inner tube portion 131 of the tape core 117A is inserted into the space between the outer protrusion portion 185 and the first projection portion 161 as illustrated in FIG. 14.

The outer protrusion portion 185 is provided to overlap each third base rib portion 164 at a position near the end portion of each third base rib portion 164 on the third core projection 159 side. The protrusion height of the outer protrusion portion 185 is higher than the protrusion height of the three third base rib portions 164 and lower than the protrusion height of the first projection portion 161 of the third core projection 159. However, the protrusion height is not limited thereto, and may be higher than the protrusion height of the first projection portion 161 and may further be higher than the protrusion height of the second projection portion 163.

On the other hand, in the third case portion 145B, the outer protrusion portion 185 is not provided on the radially outer side of the third core projection 159. That is, in the third case portion 145B, only three third base rib portions 164 are provided on the radially outer side of the third core projection 159.

Figure 14:
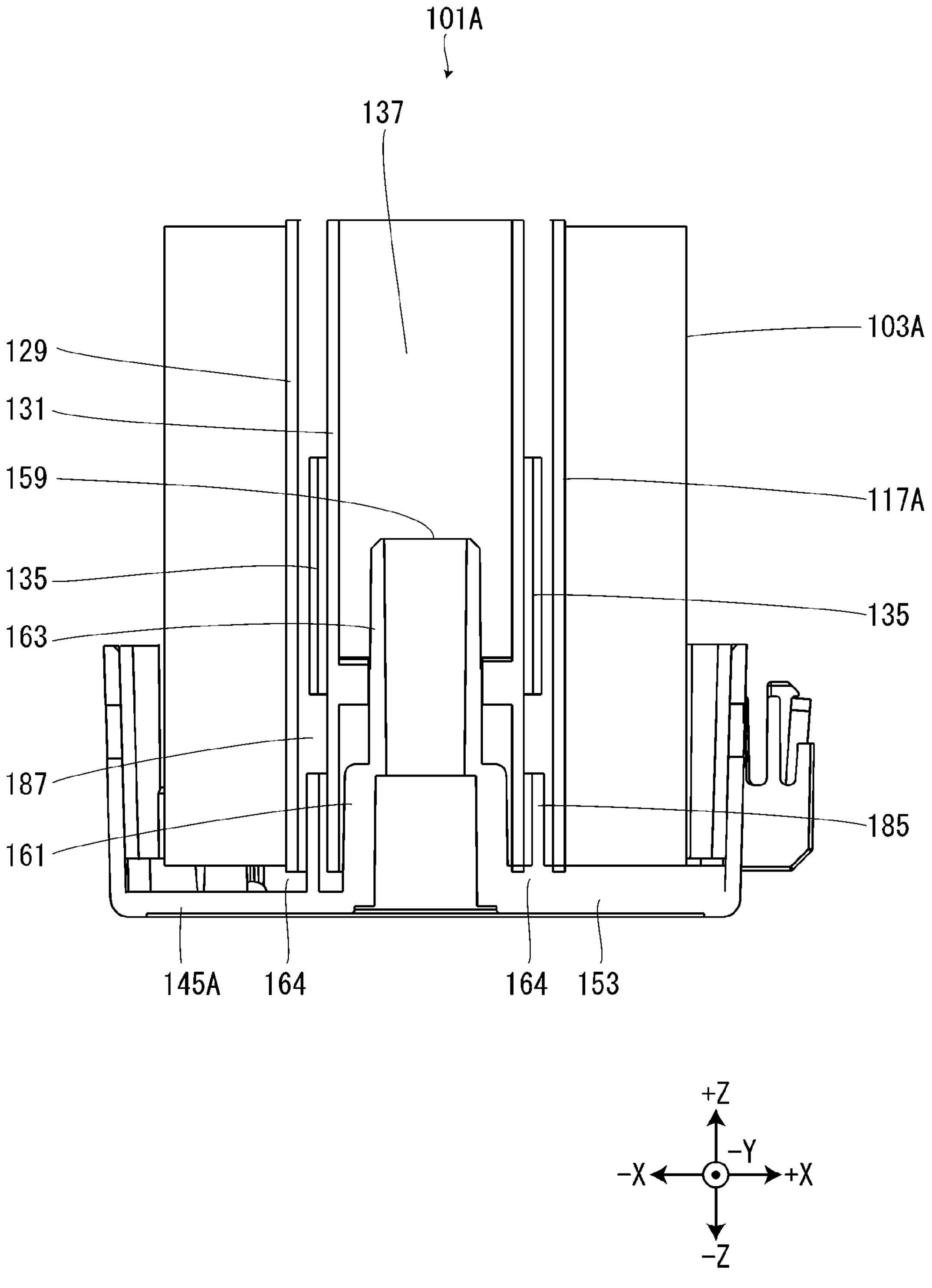
FIG. 14 is a sectional view illustrating a state where a tape roll A is replaced with another tape roll A in the tape cartridge A of the first embodiment.

As illustrated in FIG. 14, in order for the user to replace a tape roll 103A with another tape roll 103A in the tape cartridge 101A, when the other tape roll 103A is placed on the third base wall portion 153, the third core projection 159 is inserted into the core hole 137 of the tape core 117A included in the other tape roll 103A. At this time, the outer protrusion portion 185 provided in the third case portion 145A is inserted into the outer recess portion 187 provided in the tape core 117A and is received by the outer recess portion 187. Therefore, the insertion of the third core projection 159 into the core hole 137 of the tape core 117A is not blocked by the outer protrusion portion 185, and the user can replace the tape roll 103A with another tape roll 103A.

Figure 15:
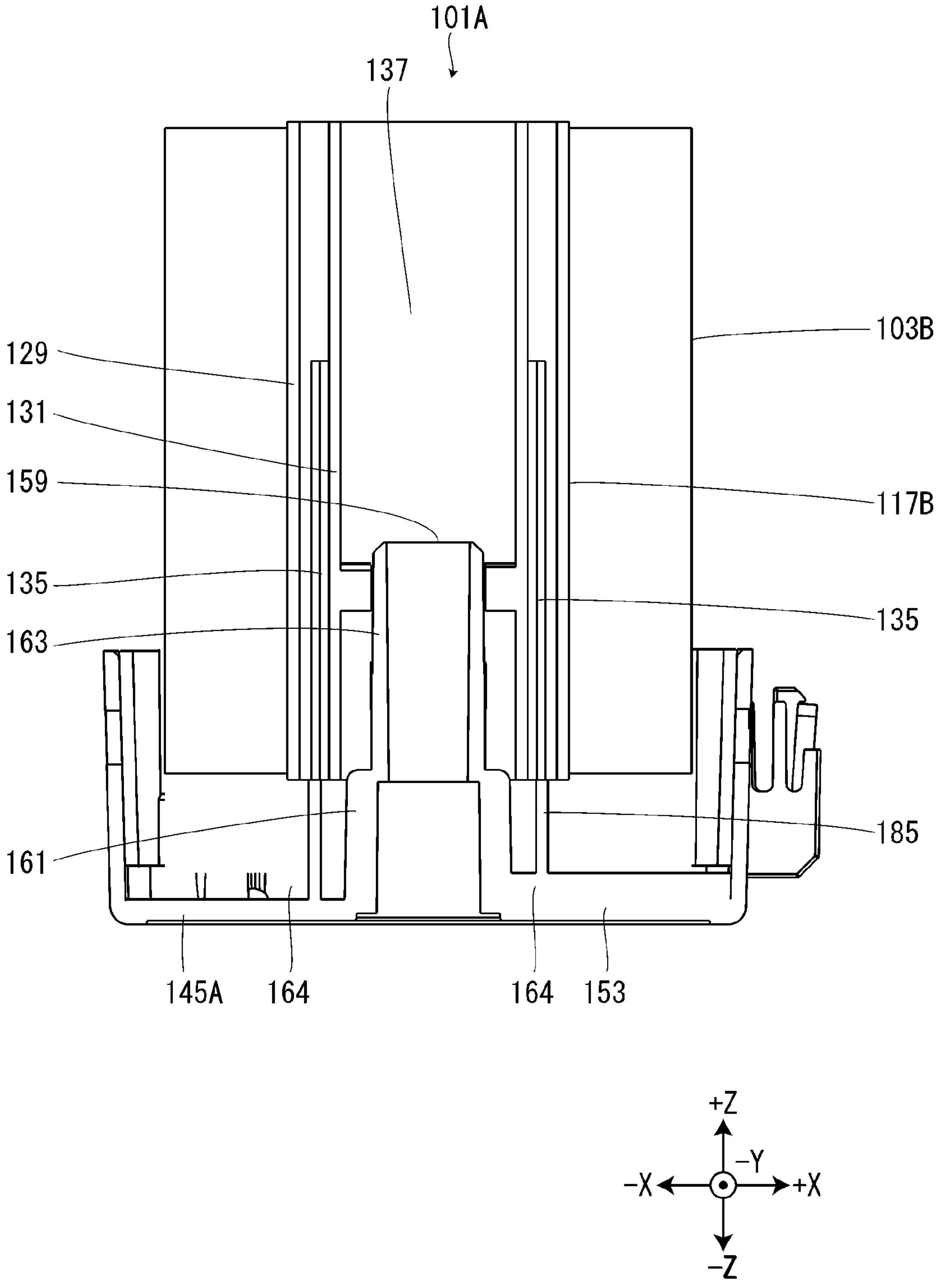
FIG. 15 is a sectional view illustrating a state where the tape roll A is to be replaced with a tape roll B in the tape cartridge A of the first embodiment.

On the other hand, as illustrated in FIG. 15, when the user mistakenly replaces the tape roll 103A with a tape roll 103B in the tape cartridge 101A, when the tape roll 103B is placed on the third base wall portion 153, the insertion of the third core projection 159 into the core hole 137 of the tape core 117B is blocked by the outer protrusion portion 185. That is, while the third core projection 159 is being inserted into the core hole 137 of the tape core 117B, the surface of the outer protrusion portion 185 provided in the third case portion 145A in the +Z direction comes into contact with the end surface of the tape core 117B in the −Z direction, more specifically, the end surfaces of the plurality of coupling rib portions 135 provided on the tape core 117B in the −Z direction.

As described above, in the first embodiment, the outer protrusion portion 185 is provided in the third case portion 145A, the outer recess portion 187 is not provided in the tape core 117B, and accordingly, the third core projection 159 enters only halfway into the core hole 137 of the tape core 117B. In this state, even when the user mounts the first case portion 141 on the third case portion 145A, the user cannot mount the first case portion 141 on the third case portion 145A. Therefore, it is possible to suppress a case where the tape roll 103A is mistakenly replaced with the tape roll 103B in the tape cartridge 101A.

Further, the fact that the insertion of the third core projection 159 into the core hole 137 of the tape core 117B is blocked is not limited to a configuration in which even a part of the third core projection 159 is not inserted into the core hole 137. As in the present embodiment, the concept also includes a configuration in which a part of the third core projection 159 is inserted into the core hole 137, but the insertion is blocked in the middle of the insertion.

Second Embodiment of Tape Core and Third Case Portion

A second embodiment of the tape core 117A, the tape core 117B, the third case portion 145A, and the third case portion 145B will be described with reference to FIGS. 16 to 19.

Figure 16:
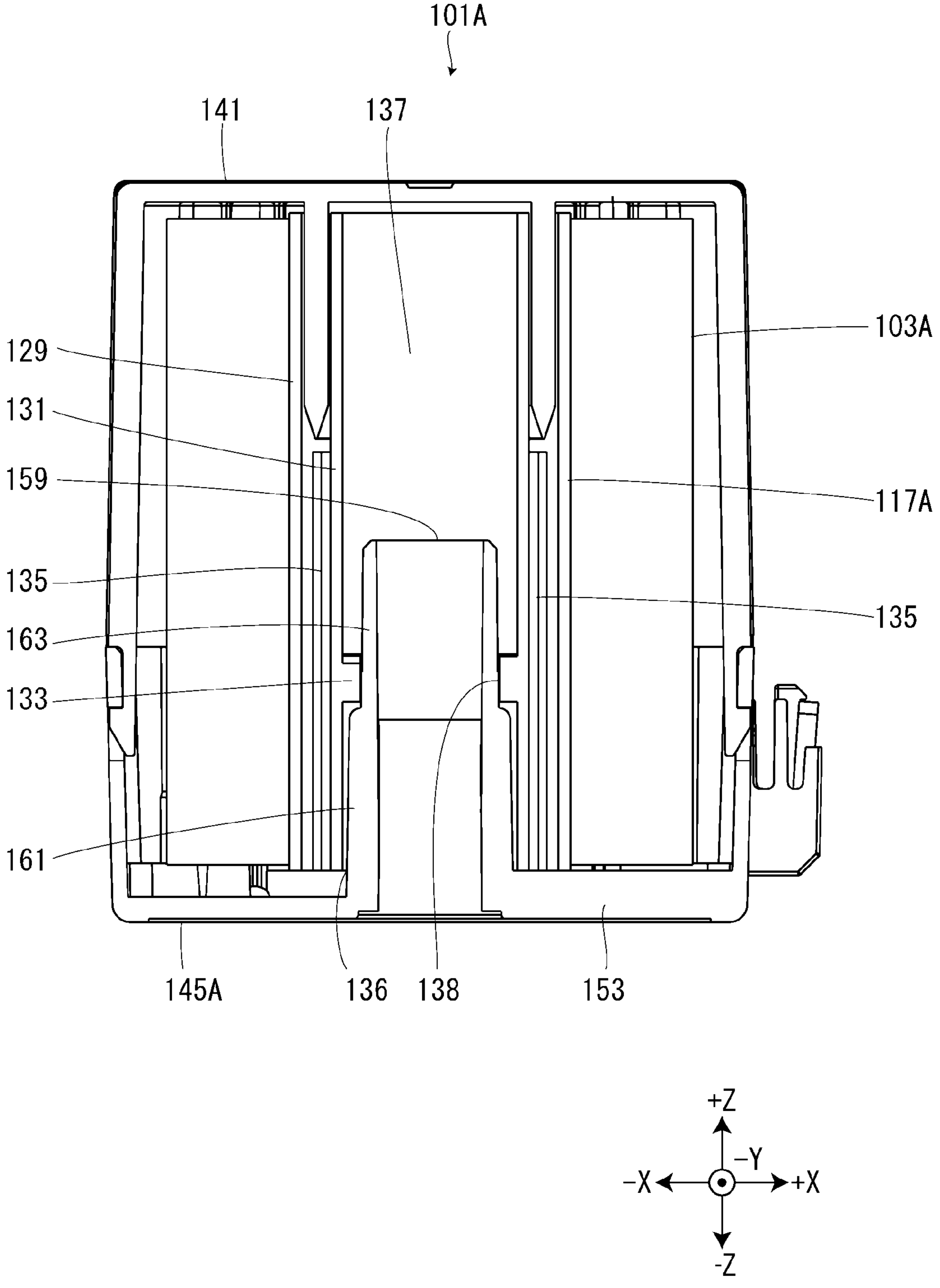
FIG. 16 is a sectional view illustrating a tape cartridge A of a second embodiment.
Figure 17:
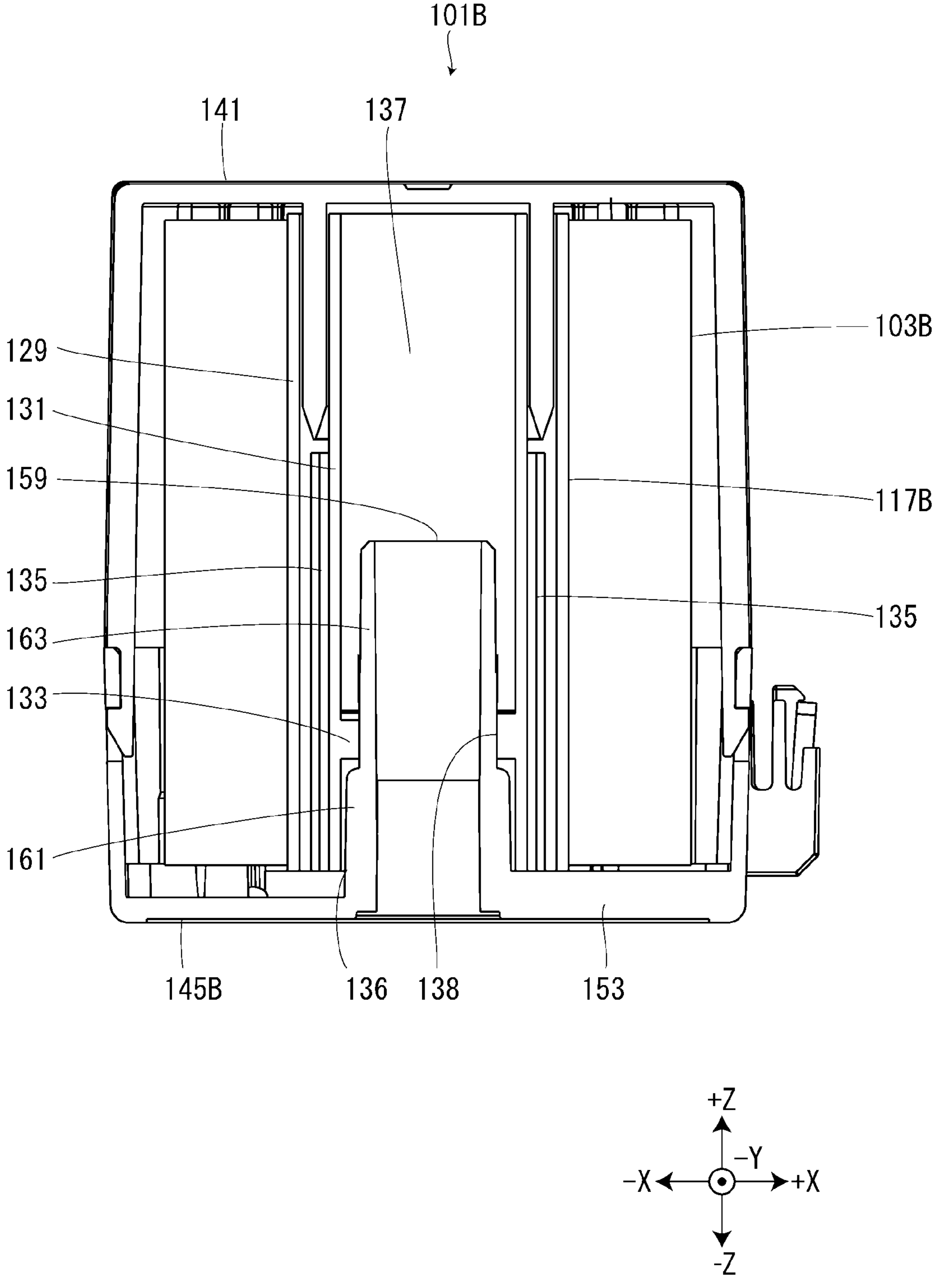
FIG. 17 is a sectional view illustrating a tape cartridge B of the second embodiment.

The tape core 117A and the tape core 117B of the second embodiment are common in that the outer recess portion 187 is not provided, similarly to the tape core 117B of the first embodiment illustrated in FIG. 13. On the other hand, the tape core 117A of the second embodiment illustrated in FIG. 16 and the tape core 117B illustrated in FIG. 17 are different from each other in that the core hole rib portion 133 provided in the tape core 117A is positioned in the +Z direction compared to the core hole rib portion 133 provided in the tape core 117B. The depth of the core hole 137 provided in the tape core 117A is larger than the depth of the core hole 137 provided in the tape core 117B. Further, the depth of the core hole 137 means a dimension from the end surface of the tape core 117 in the −Z direction, that is, the projection insertion port 136 to the surface of the core hole rib portion 133 in the −Z direction.

In addition, the third case portion 145A and the third case portion 145B of the second embodiment are common in that the outer protrusion portion 185 is not provided, similarly to the third case portion 145B of the first embodiment illustrated in FIG. 13. On the other hand, the third case portion 145A and the third case portion 145B of the second embodiment are different from each other in that the protrusion height of the first projection portions 161 provided in the third case portion 145A illustrated in FIG. 16 is higher than the protrusion height of the first projection portion 161 provided in the third case portion 145B illustrated in FIG. 17.

Figure 18:
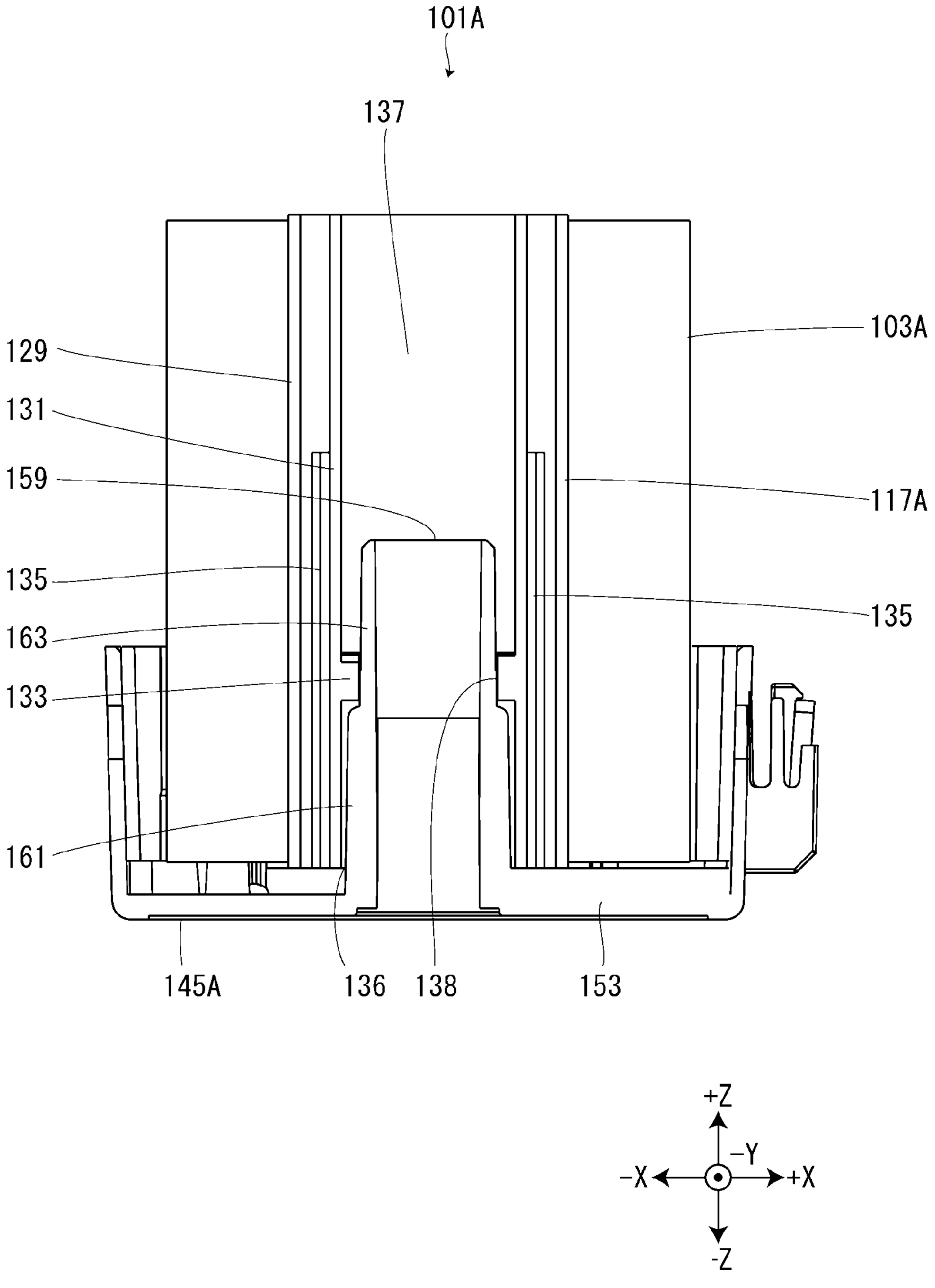
FIG. 18 is a sectional view illustrating a state where a tape roll A is replaced with another tape roll A in the tape cartridge A of the second embodiment.

As illustrated in FIG. 18, in order for the user to replace the tape roll 103A with another tape roll 103A in the tape cartridge 101A, when the other tape roll 103A is placed on the third base wall portion 153, the third core projection 159 is inserted into the core hole 137 of the tape core 117A included in the other tape roll 103A. At this time, the first projection portion 161 provided in the third case portion 145A is inserted into the core hole 137 provided in the tape core 117A and is received by the core hole 137. Therefore, the insertion of the third core projection 159 into the core hole 137 of the tape core 117A is not blocked by the core hole rib portion 133, and the user can replace the tape roll 103A with another tape roll 103A.

Figure 19:
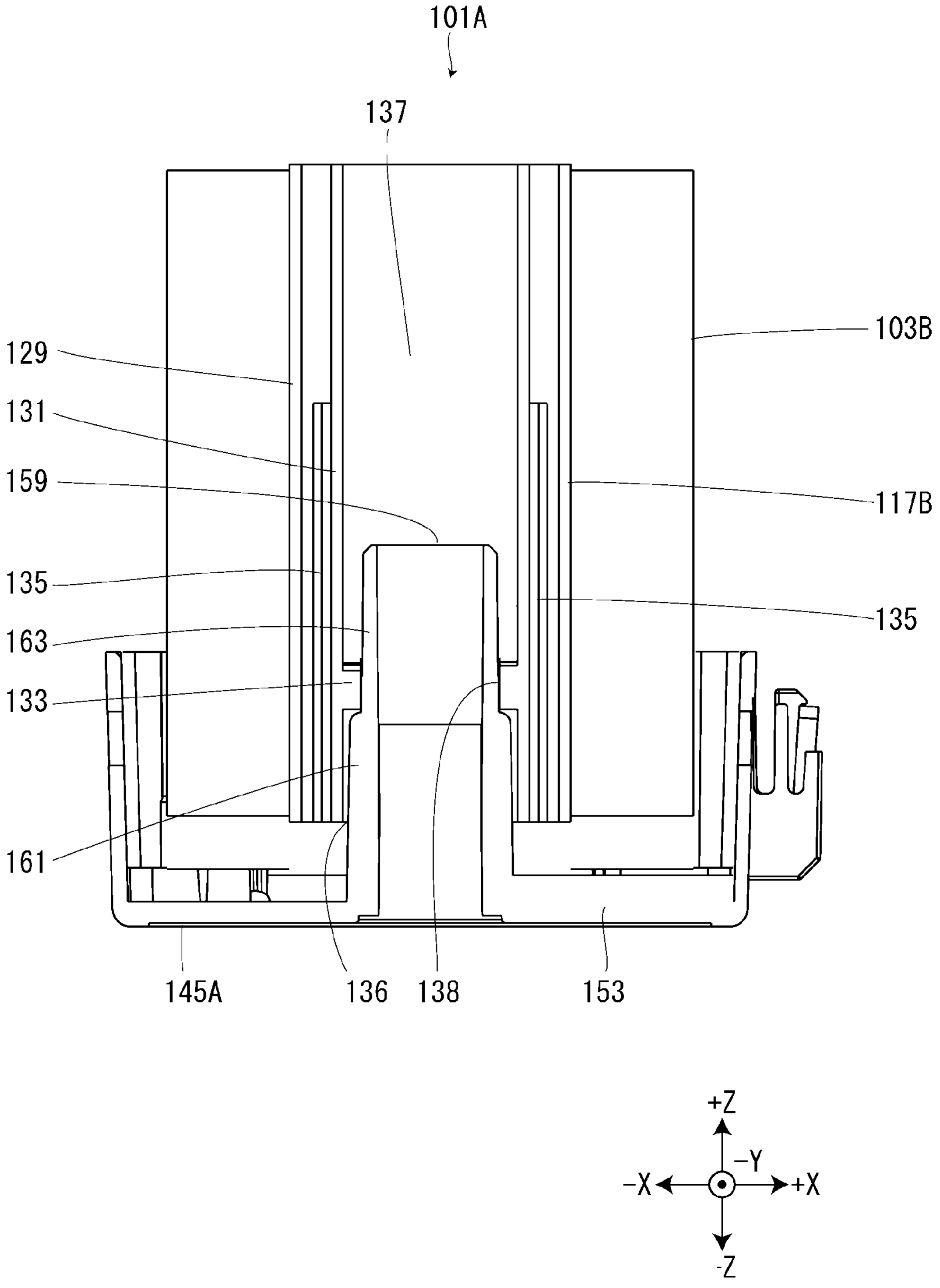
FIG. 19 is a sectional view illustrating a state where the tape roll A is to be replaced with a tape roll B in the tape cartridge A of the second embodiment.

On the other hand, as illustrated in FIG. 19, when the user mistakenly replaces the tape roll 103A with the tape roll 103B in the tape cartridge 101A, when the tape roll 103B is placed on the third base wall portion 153, the insertion of the third core projection 159 into the core hole 137 of the tape core 117B is blocked by the first projection portion 161. That is, while the third core projection 159 is being inserted into the core hole 137 of the tape core 117B, the surface of the first projection portion 161 provided in the third case portion 145A in the +Z direction comes into contact with the surface of the core hole rib portion 133 provided in the tape core 117B in the −Z direction.

As described above, in the second embodiment, the protrusion height of the first projection portion 161 provided in the third case portion 145A is high, the depth of the core hole 137 provided in the tape core 117B is small, and accordingly, the third core projection 159 is inserted only halfway into the core hole 137 of the tape core 117B. In this state, even when the user mounts the first case portion 141 on the third case portion 145A, the user cannot mount the first case portion 141 on the third case portion 145A. Therefore, it is possible to suppress a case where the tape roll 103A is mistakenly replaced with the tape roll 103B in the tape cartridge 101A.

Further, the configuration is not limited to a configuration in which the first projection portion 161 comes into contact with the core hole rib portion 133 to block the insertion of the third core projection 159 into the core hole 137 of the tape core 117B, and a configuration in which the second projection portion 163 comes into contact with the core hole rib portion 133 to block the insertion of the third core projection 159 into the core hole 137 of the tape core 117B may be employed. In this case, for example, the diameter of the projection insertion opening 138 provided in the tape core 117A may be smaller than the diameter of the projection insertion opening 138 provided in the tape core 117B.

Third Embodiment of Tape Core and Third Case Portion

A third embodiment of the tape core 117A, the tape core 117B, the third case portion 145A, and the third case portion 145B will be described with reference to FIGS. 20 to 23.

The tape core 117A and the tape core 117B of the third embodiment are common in that the outer recess portion 187 is provided, similarly to the tape core 117A of the first embodiment illustrated in FIG. 12. On the other hand, the tape core 117A and the tape core 117B of the third embodiment are different from each other in that the end portions of the plurality of coupling rib portions 135 provided in the tape core 117A illustrated in FIG. 20 in the −Z direction are positioned in the +Z direction compared to the end portions of the plurality of coupling rib portions 135 provided in the tape core 117B illustrated in FIG. 21 in the −Z direction. That is, the depth of the outer recess portion 187 provided in the tape core 117A is larger than the depth of the outer recess portion 187 provided in the tape core 117B. Further, the depth of the outer recess portion 187 means a dimension from the end surface of the tape core 117 in the −Z direction to the end surface of the plurality of coupling rib portions 135 in the −Z direction.

Figure 20:
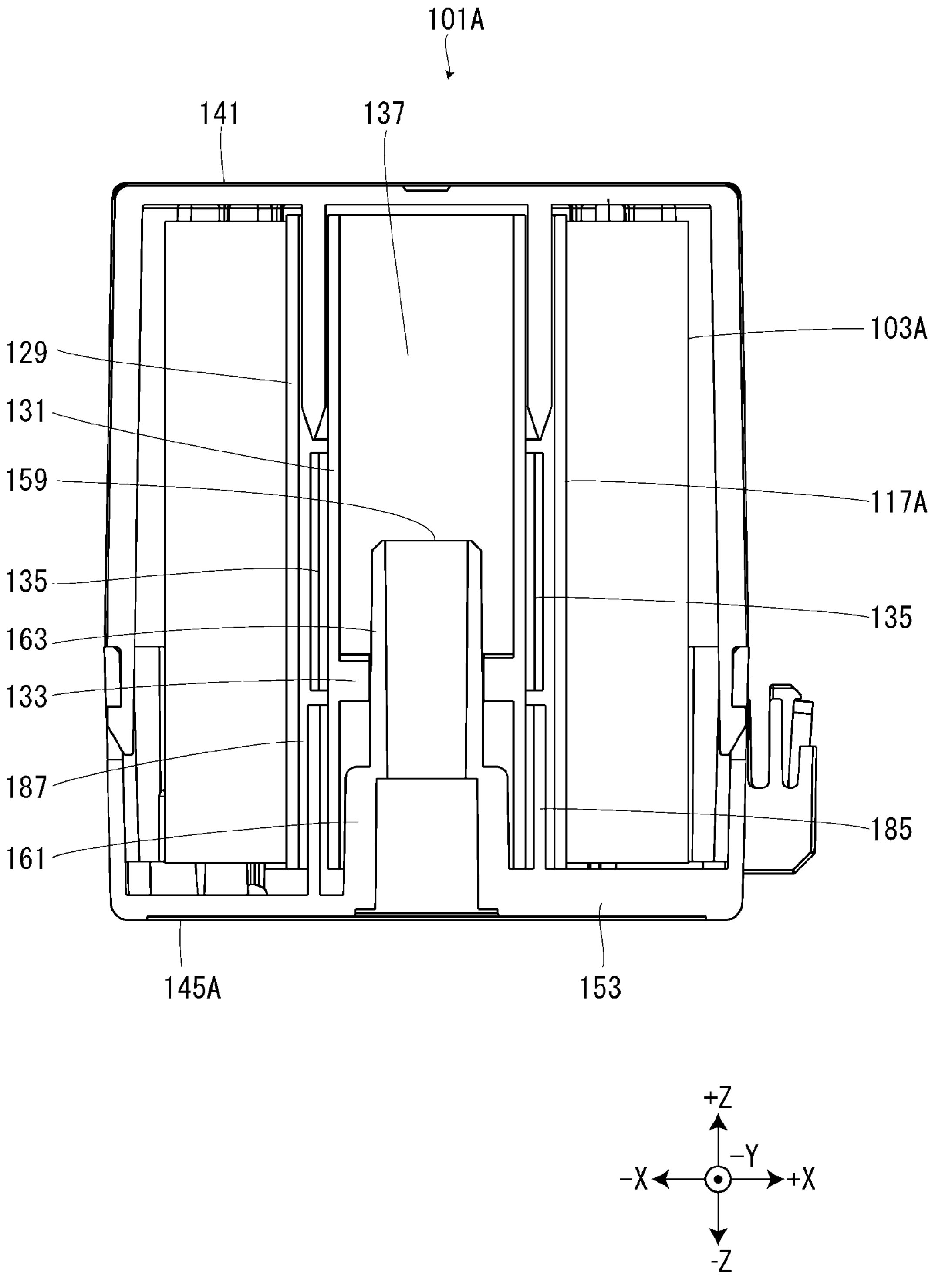
FIG. 20 is a sectional view illustrating a tape cartridge A of a third embodiment.
Figure 21:
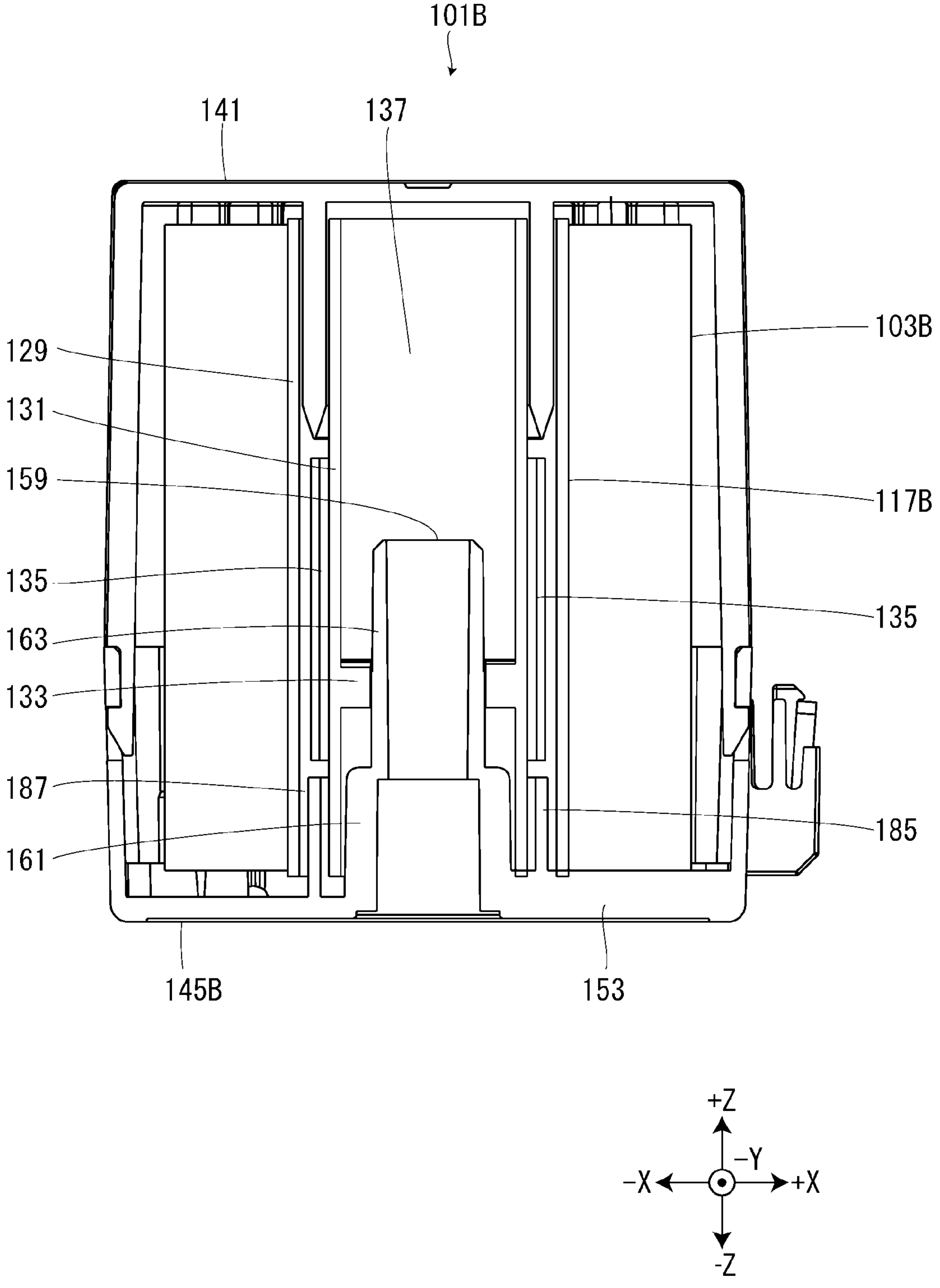
FIG. 21 is a sectional view illustrating a tape cartridge B of the third embodiment.

In addition, the third case portion 145A and the third case portion 145B of the third embodiment are common in that the outer protrusion portion 185 is provided, similarly to the third case portion 145A of the first embodiment illustrated in FIG. 12. On the other hand, the third case portion 145A and the third case portion 145B of the third embodiment are different from each other in that the protrusion height of the outer protrusion portion 185 provided in the third case portion 145A illustrated in FIG. 20 is higher than the protrusion height of the outer protrusion portion 185 provided in the third case portion 145B illustrated in FIG. 21.

Figure 22:
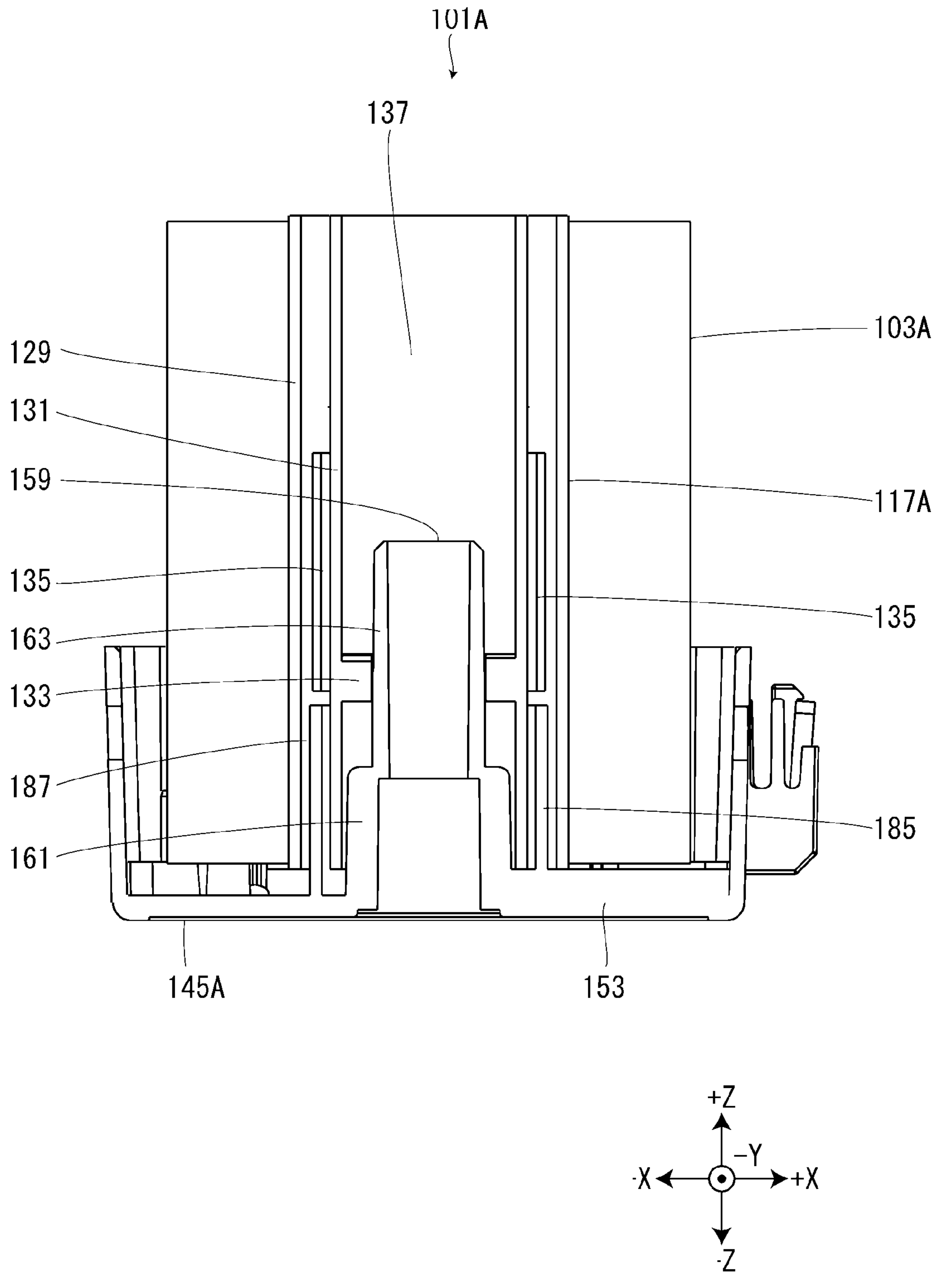
FIG. 22 is a sectional view illustrating a state where a tape roll A is replaced with another tape roll A in the tape cartridge A of the third embodiment.

As illustrated in FIG. 22, in order for the user to replace the tape roll 103A with another tape roll 103A in the tape cartridge 101A, when the other tape roll 103A is placed on the third base wall portion 153, the third core projection 159 is inserted into the core hole 137 of the tape core 117A included in the other tape roll 103A. At this time, the outer protrusion portion 185 provided in the third case portion 145A is inserted into the outer recess portion 187 provided in the tape core 117A and is received by the outer recess portion 187. Therefore, the insertion of the third core projection 159 into the core hole 137 of the tape core 117A is not blocked by the outer protrusion portion 185, and the user can replace the tape roll 103A with another tape roll 103A.

Figure 23:
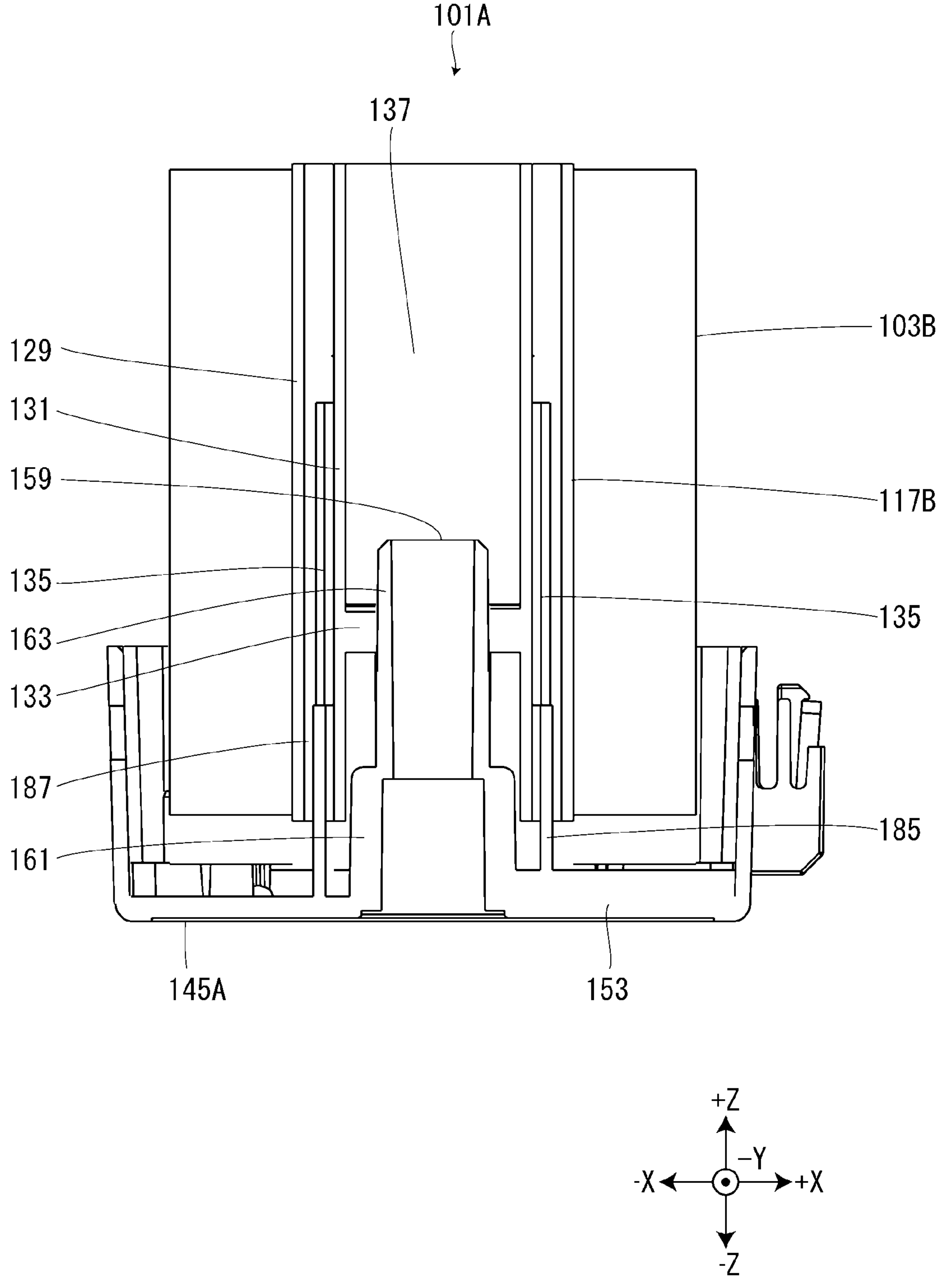
FIG. 23 is a sectional view illustrating a state where the tape roll A is to be replaced with a tape roll B in the tape cartridge A of the third embodiment.

On the other hand, as illustrated in FIG. 23, when the user mistakenly replaces the tape roll 103A with the tape roll 103B in the tape cartridge 101A, when the tape roll 103B is placed on the third base wall portion 153, the insertion of the third core projection 159 into the core hole 137 of the tape core 117B is blocked by the outer protrusion portion 185. That is, while the third core projection 159 is being inserted into the core hole 137 of the tape core 117B, the surface of the outer protrusion portion 185 provided in the third case portion 145A in the +Z direction comes into contact with the surface of the core hole rib portion 133 provided in the tape core 117B in the −Z direction.

As described above, in the third embodiment, the protrusion height of the outer protrusion portion 185 provided in the third case portion 145A is high, the depth of the outer recess portion 187 provided in the tape core 117B is small, and accordingly, the third core projection 159 is inserted only halfway into the core hole 137 of the tape core 117B. In this state, even when the user mounts the first case portion 141 on the third case portion 145A, the user cannot mount the first case portion 141 on the third case portion 145A. Therefore, it is possible to suppress a case where the tape roll 103A is mistakenly replaced with the tape roll 103B in the tape cartridge 101A.

Fourth Embodiment of Tape Core and Third Case Portion

A fourth embodiment of the tape core 117A, the tape core 117B, the third case portion 145A, and the third case portion 145B will be described with reference to FIGS. 24 to 27.

Figure 24:
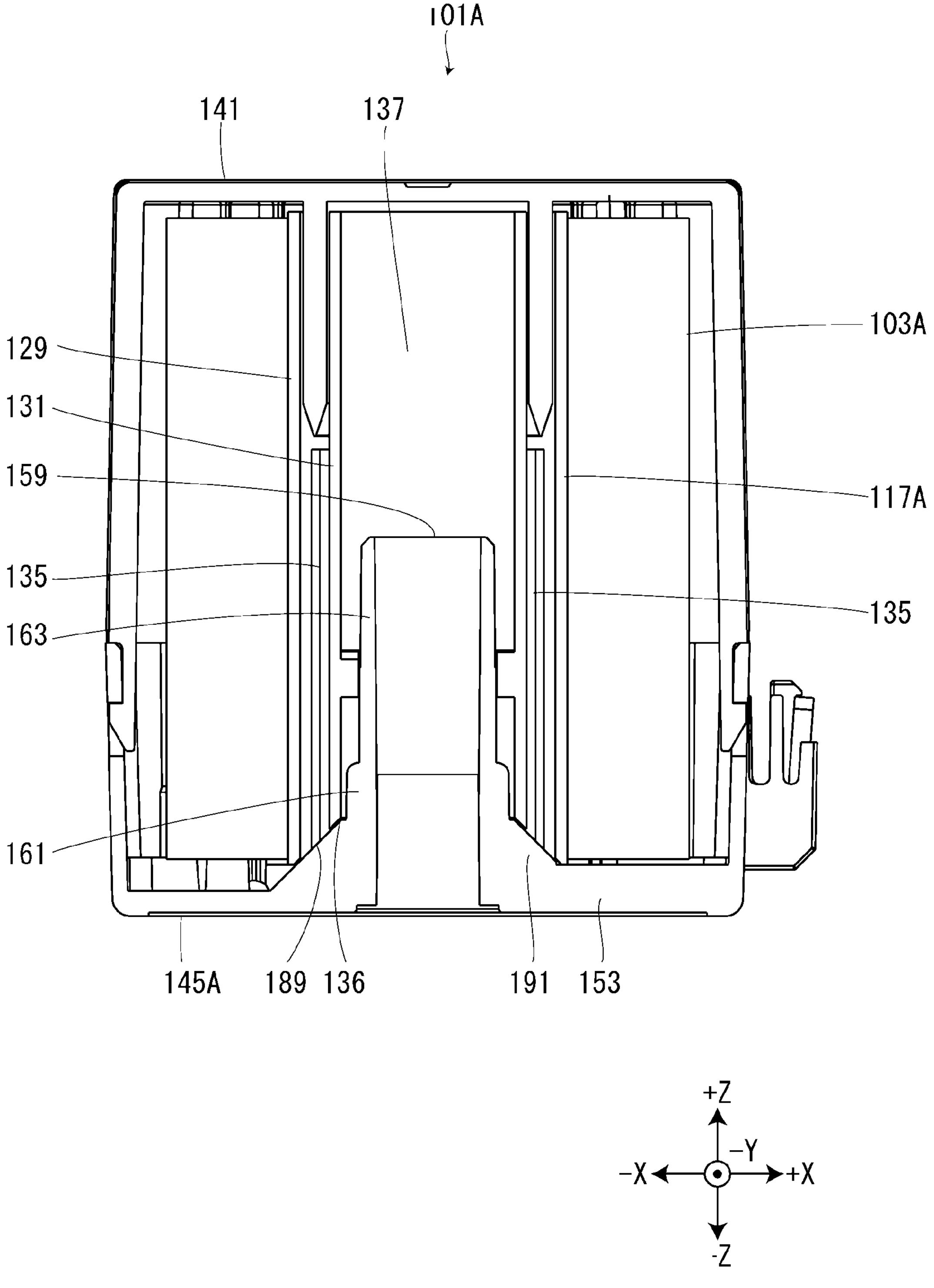
FIG. 24 is a sectional view illustrating a tape cartridge A of a fourth embodiment.
Figure 25:
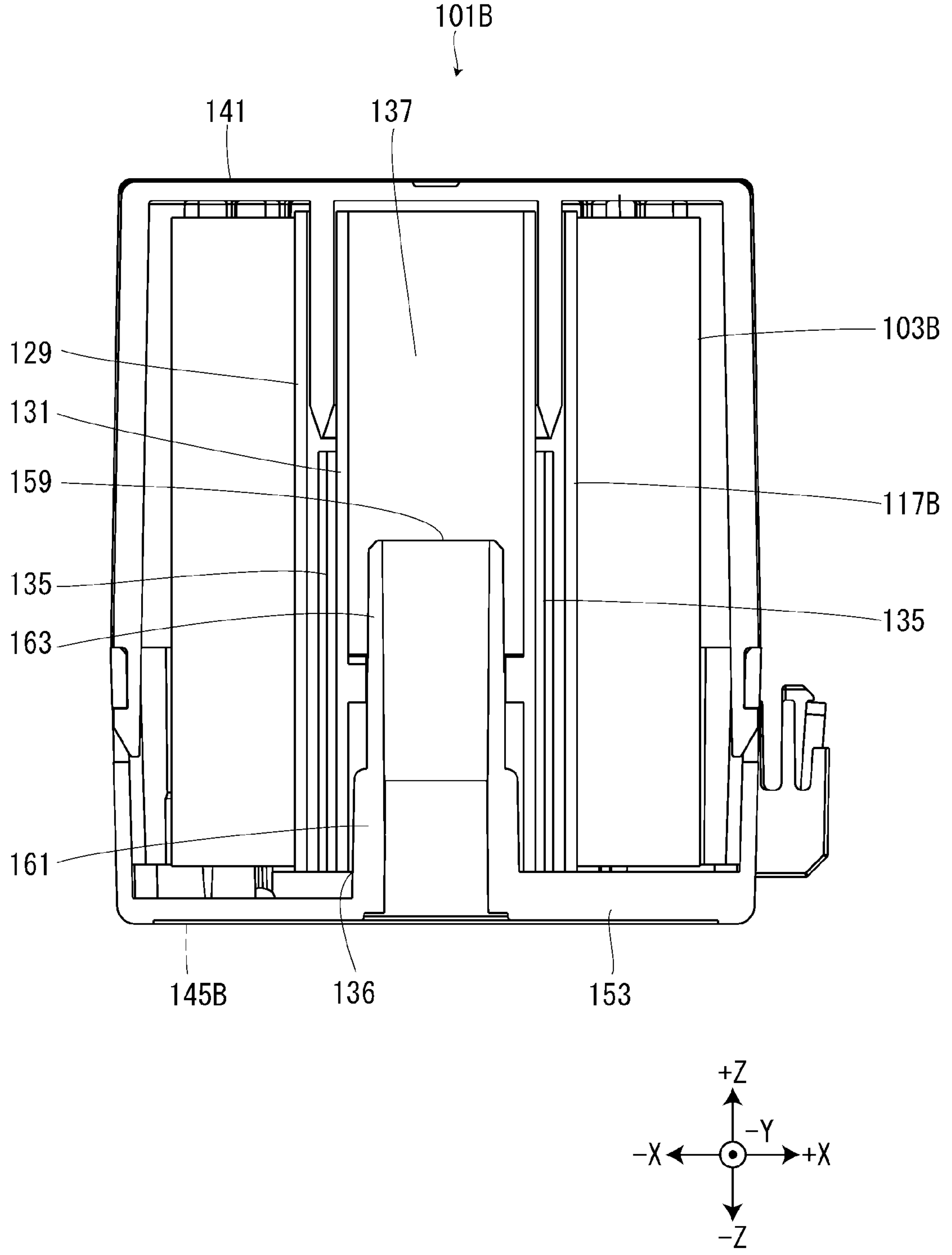
FIG. 25 is a sectional view illustrating a tape cartridge B of the fourth embodiment.

The tape core 117A and the tape core 117B of the fourth embodiment are common in that the outer recess portion 187 is not provided, similarly to the tape core 117B of the first embodiment illustrated in FIG. 13. On the other hand, the tape core 117A and the tape core 117B of the fourth embodiment are different from each other in that the tape core 117A illustrated in FIG. 24 is provided with an outer edge recess portion 189 received by an outer edge protrusion portion 191 which will be described later, whereas the tape core 117B illustrated in FIG. 25 is not provided with the outer edge recess portion 189.

On the end surface of the tape core 117A in the −Z direction, the outer edge recess portion 189 is provided at the outer edge portion of the projection insertion port 136. The outer edge recess portion 189 is formed in a substantially conical base tubular space. That is, the depth of the outer edge recess portion 189 is larger on the inside of the outer edge recess portion 189 than on the outside of the outer edge recess portion 189. More specifically, the end portions of the plurality of coupling rib portions 135 in the −Z direction are positioned in the +Z direction with respect to the end portion of the outer tube portion 129 in the −Z direction, and the end portion of the inner tube portion 131 in the −Z direction is positioned in the +Z direction with respect to the end portions of the plurality of coupling rib portions 135 in the −Z direction.

Meanwhile, the end surface of the tape core 117B in the −Z direction, the outer edge recess portion 189 is not provided at the outer edge portion of the projection insertion port 136. That is, the end portion of the outer tube portion 129 in the −Z direction, the end portion of the plurality of coupling rib portions 135 in the −Z direction, and the end portion of the inner tube portion 131 in the −Z direction are positioned at substantially the same positions in the Z direction.

In addition, the third case portion 145A and the third case portion 145B of the fourth embodiment are common in that the outer protrusion portion 185 is not provided, similarly to the third case portion 145B of the first embodiment illustrated in FIG. 13. On the other hand, the third case portion 145A and the third case portion 145B of the fourth embodiment are different from each other in that the third case portion 145A illustrated in FIG. 24 is provided with the outer edge protrusion portion 191 received by the outer edge recess portion 189 described above, whereas the third case portion 145B illustrated in FIG. 25 is not provided with the outer edge protrusion portion 191.

From the third base wall portion 153 of the third case portion 145A, the outer edge protrusion portion 191 is positioned at the outer edge portion of the third core projection 159 and protrudes in the +Z direction. The outer edge protrusion portion 191 is formed in a substantially conical base tubular shape having a shape complementary to the outer edge recess portion 189. That is, the protrusion height of the outer edge protrusion portion 191 is higher on the inside of the outer edge protrusion portion 191 than on the outside of the outer edge protrusion portion 191. The outer edge protrusion portion 191 is integrally formed with the third core projection 159. That is, the inside of the outer edge protrusion portion 191 is coupled to the outer peripheral surface of the first projection portion 161 of the third core projection 159.

On the other hand, in the third case portion 145B, the outer edge protrusion portion 191 is not provided on the outer edge portion of the third core projection 159.

Figure 26:
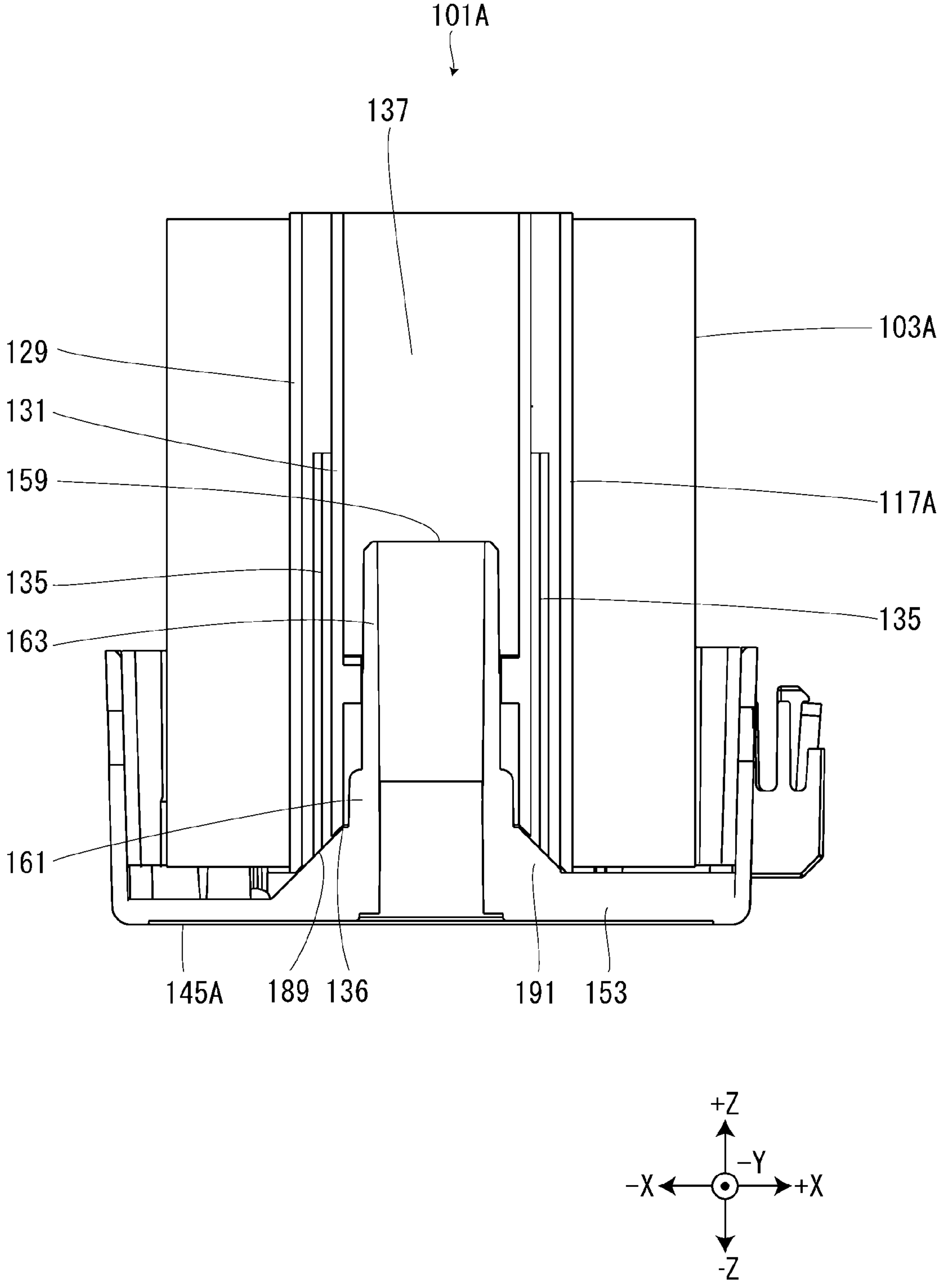
FIG. 26 is a sectional view illustrating a state where a tape roll A is replaced with another tape roll A in the tape cartridge A of the fourth embodiment.

As illustrated in FIG. 26, in order for the user to replace the tape roll 103A with another tape roll 103A in the tape cartridge 101A, when the other tape roll 103A is placed on the third base wall portion 153, the third core projection 159 is inserted into the core hole 137 of the tape core 117A included in the other tape roll 103A. At this time, the outer edge protrusion portion 191 provided in the third case portion 145A is received by the outer edge recess portion 189 provided in the tape core 117A. Therefore, the insertion of the third core projection 159 into the core hole 137 of the tape core 117A is not blocked by the outer edge protrusion portion 191, and the user can replace the tape roll 103A with another tape roll 103A.

Figure 27:
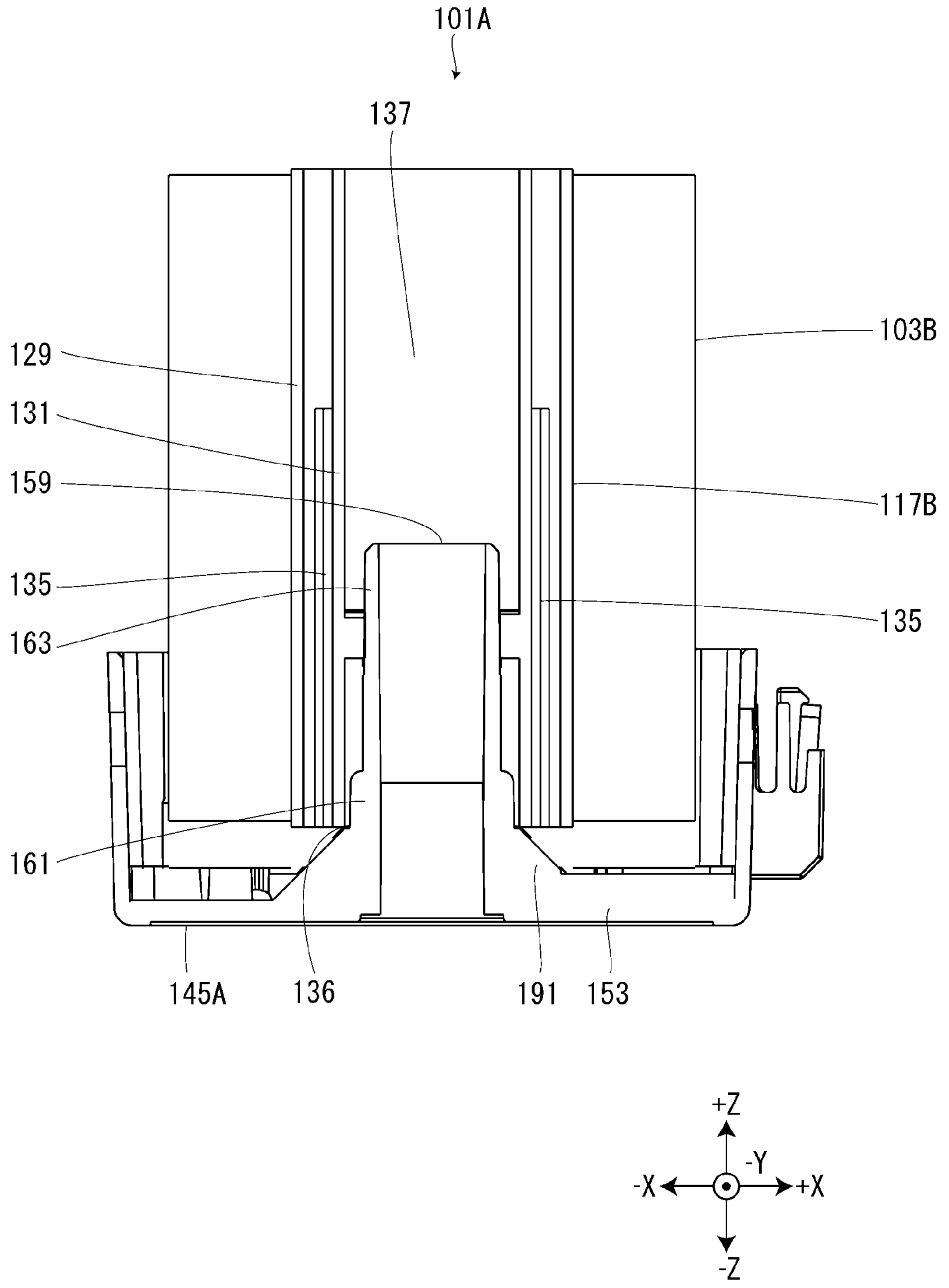
FIG. 27 is a sectional view illustrating a state where the tape roll A is to be replaced with the tape roll B in the tape cartridge A of the fourth embodiment.

On the other hand, as illustrated in FIG. 27, when the user mistakenly replaces the tape roll 103A with the tape roll 103B in the tape cartridge 101A, when the tape roll 103B is placed on the third base wall portion 153, the insertion of the third core projection 159 into the core hole 137 of the tape core 117B is blocked by the outer edge protrusion portion 191. That is, while the third core projection 159 is being inserted into the core hole 137 of the tape core 117B, the outer edge protrusion portion 191 provided in the third case portion 145A comes into contact with the end surface of the tape core 117B in the −Z direction, more specifically, the outer edge portion of the projection insertion port 136.

As described above, in the fourth embodiment, the outer edge protrusion portion 191 is provided in the third case portion 145A, the outer edge recess portion 189 is not provided in the tape core 117B, and accordingly, the third core projection 159 enters only halfway into the core hole 137 of the tape core 117B. In this state, even when the user mounts the first case portion 141 on the third case portion 145A, the user cannot mount the first case portion 141 on the third case portion 145A. Therefore, it is possible to suppress a case where the tape roll 103A is mistakenly replaced with the tape roll 103B in the tape cartridge 101A.

Figure 28:
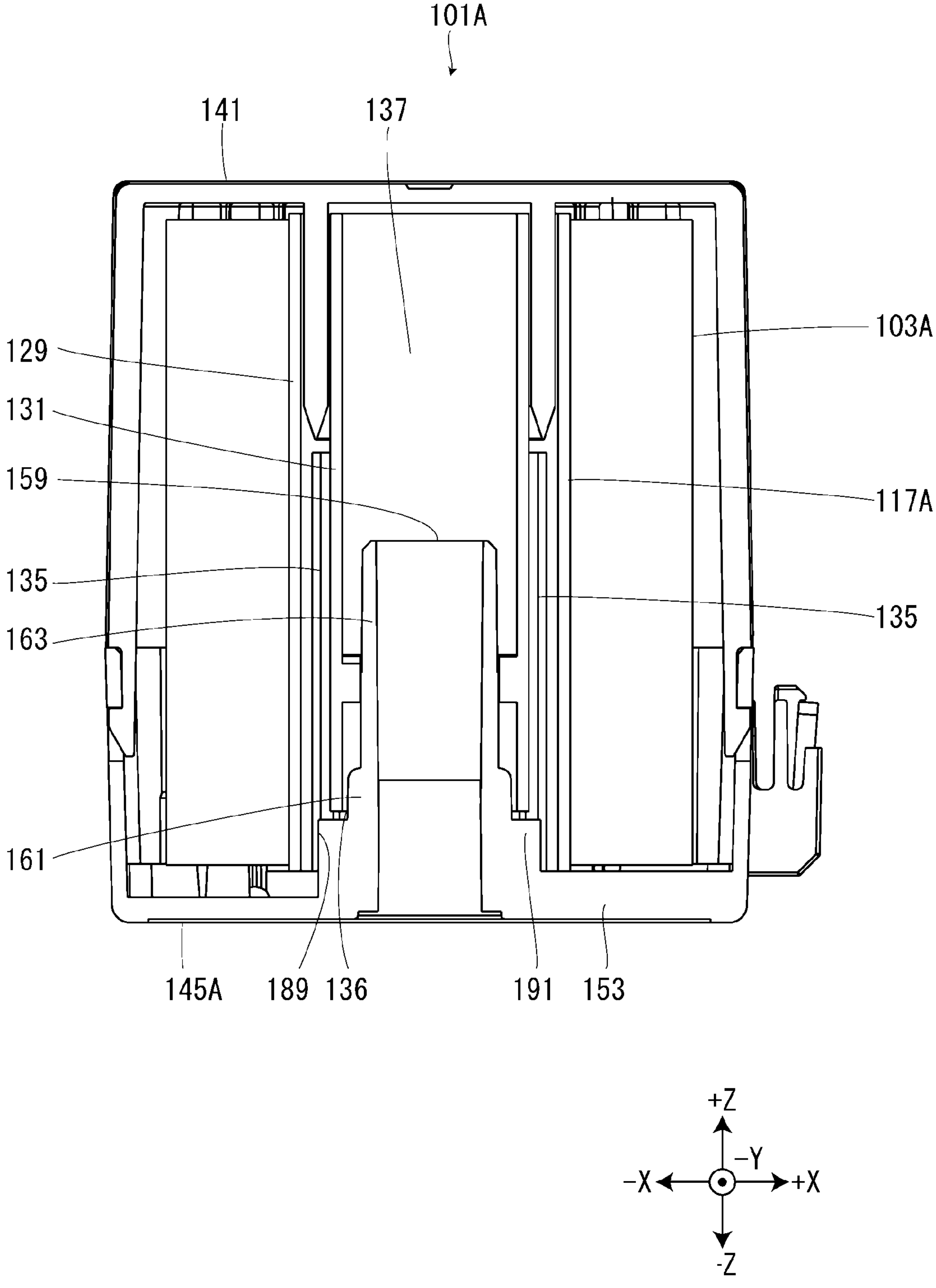
FIG. 28 is a sectional view illustrating a modification example of the tape cartridge A of the fourth embodiment.

In addition, in the fourth embodiment, the outer edge recess portion 189 is formed in a substantially conical base tubular space, and the outer edge protrusion portion 191 is formed in a substantially conical base tubular shape. However, the shapes of the outer edge protrusion portion 191 and the outer edge recess portion 189 are not limited to a substantially conical base tubular shape. For example, as illustrated in FIG. 28, the outer edge recess portion 189 may be formed in a substantially cylindrical space, and the outer edge protrusion portion 191 may be formed in a substantially cylindrical shape. Furthermore, the configuration is not limited to a configuration in which the outer edge recess portion 189 and the outer edge protrusion portion 191 have the same shape, and the outer edge protrusion portion 191 can be received by the outer edge recess portion 189. For example, the outer edge recess portion 189 may be formed in a substantially cylindrical space, and the outer edge protrusion portion 191 may be formed in a substantially conical base tubular shape.

Fifth Embodiment of Tape Core and Third Case Portion

A fifth embodiment of the tape core 117A, the tape core 117B, the third case portion 145A, and the third case portion 145B will be described with reference to FIGS. 29 to 35.

Figure 29:
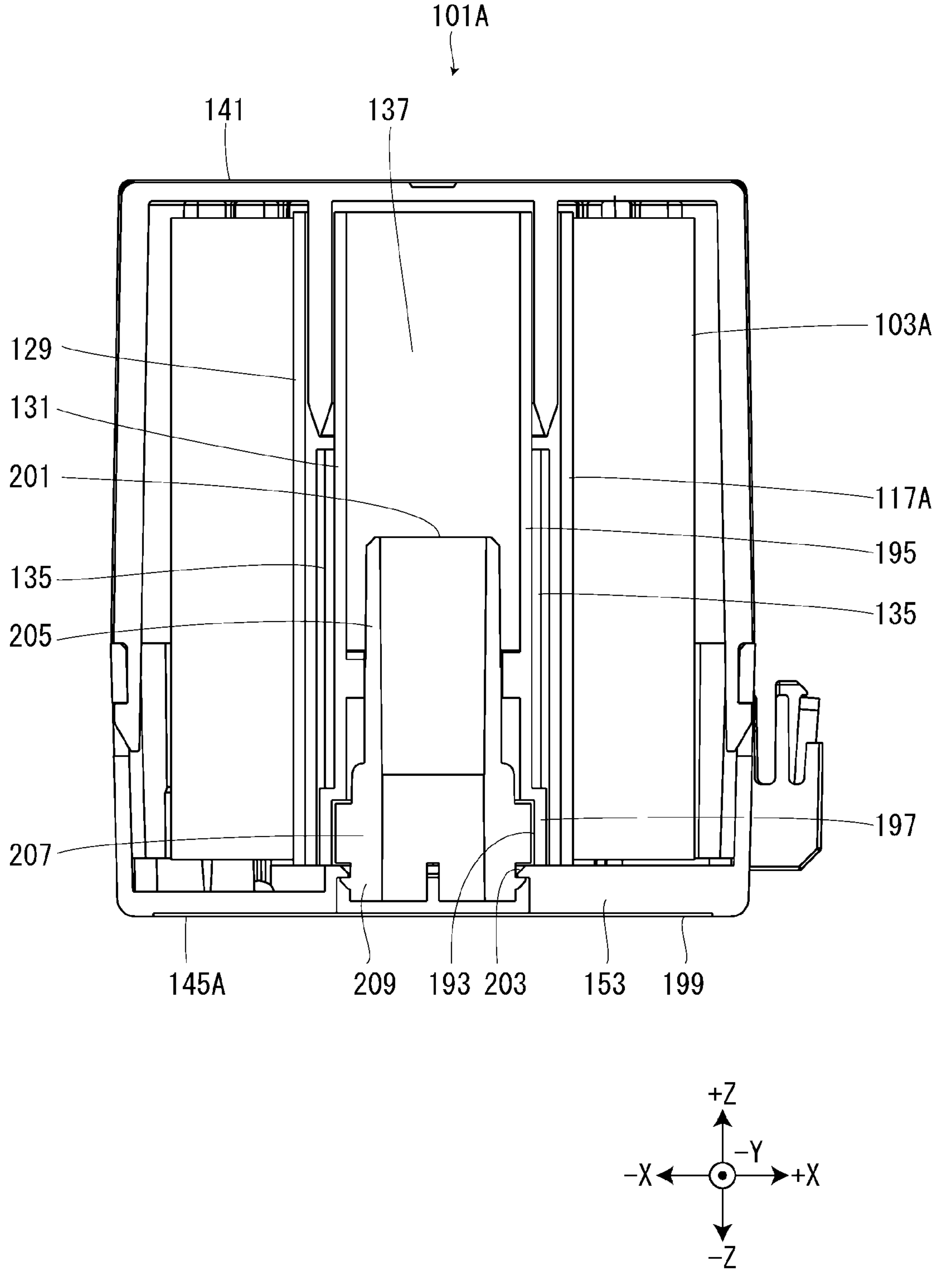
FIG. 29 is a sectional view illustrating a tape cartridge A of a fifth embodiment.
Figure 30:
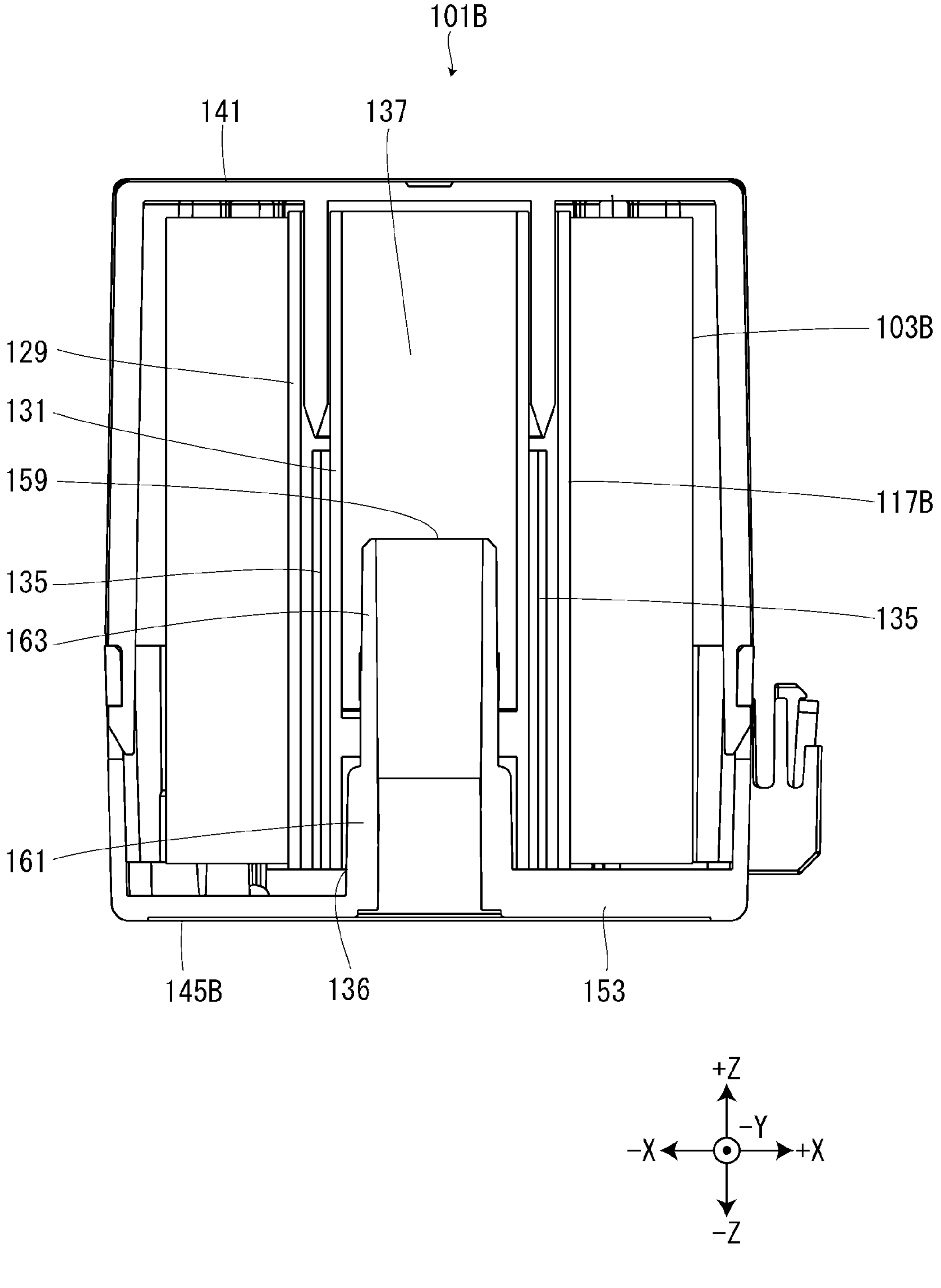
FIG. 30 is a sectional view illustrating a tape cartridge B of the fifth embodiment.

The tape core 117A and the tape core 117B of the fifth embodiment are common in that the outer recess portion 187 is not provided, similarly to the tape core 117B of the first embodiment illustrated in FIG. 13. On the other hand, the tape core 117A and the tape core 117B of the fifth embodiment are different from each other in that the tape core 117A illustrated in FIG. 29 is provided with an engaging recess portion 193 for engaging with a second rotating body portion 207 which will be described later, whereas the tape core 117B illustrated in FIG. 30 is not provided with the engaging recess portion 193.

Figure 33:
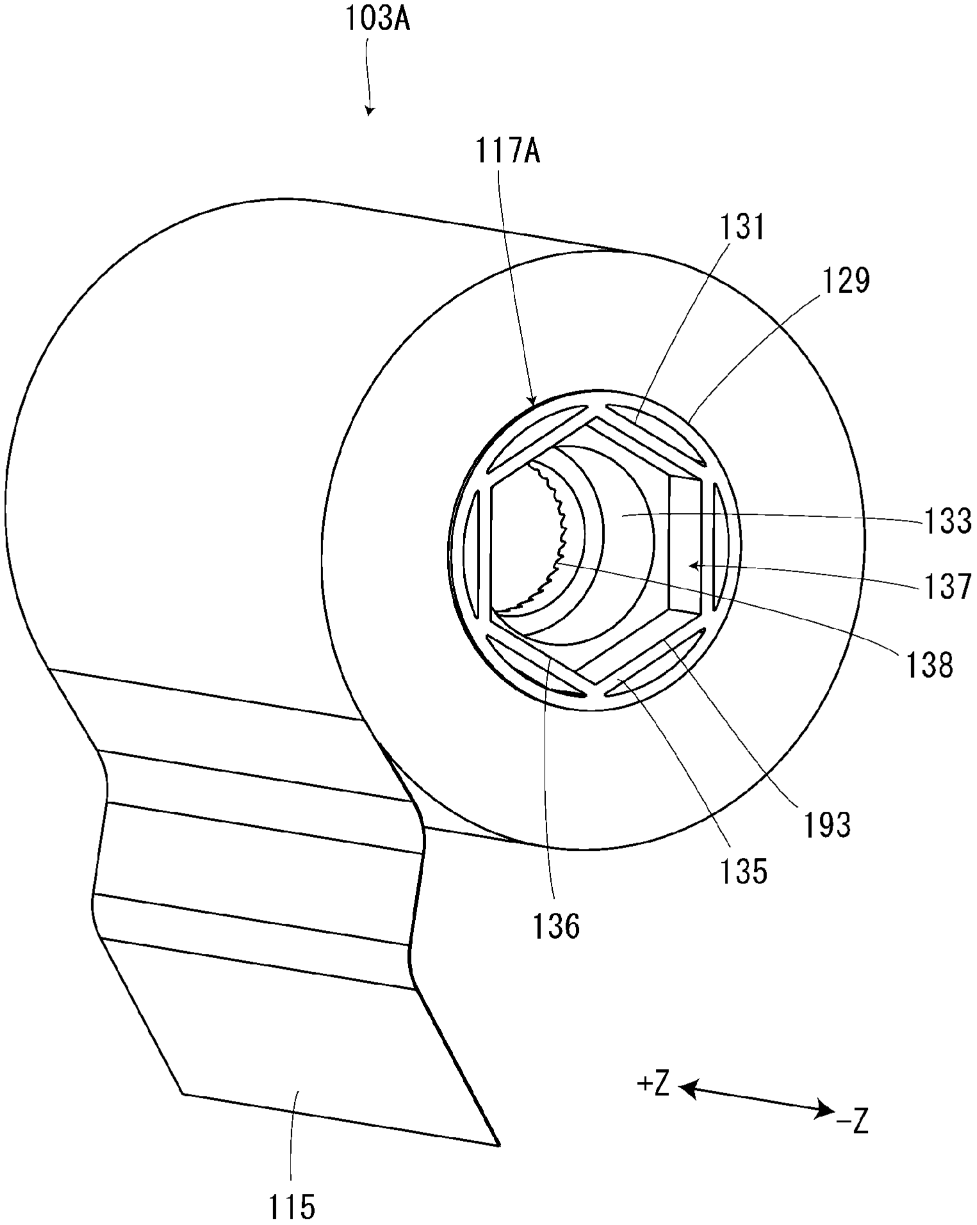
FIG. 33 is a perspective view of a tape core A included in the tape cartridge A of the fifth embodiment.

In the tape core 117A, the inner tube portion 131 includes a cylindrical portion 195 and a square tube portion 197 coupled to the cylindrical portion 195 in the −Z direction. The cylindrical portion 195 is formed in a cylindrical shape. As illustrated in FIG. 33, the square tube portion 197 is formed in a substantially regular hexagonal tubular shape inscribed in the outer tube portion 129. The engaging recess portion 193 is provided on the end surface of the square tube portion 197 in the −Z direction.

On the other hand, the tape core 117B is not provided with the engaging recess portion 193. That is, in the tape core 117B, the inner tube portion 131 is formed in a substantially cylindrical shape as a whole.

In addition, the third case portion 145A and the third case portion 145B of the fifth embodiment are common in that the outer protrusion portion 185 is not provided, similarly to the third case portion 145B of the first embodiment illustrated in FIG. 13. On the other hand, the third case portion 145A and the third case portion 145B of the fifth embodiment are different from each other in that the third case portion 145A illustrated in FIG. 29 is composed of two components, a case portion main body 199 and a rotating body 201, whereas the third case portion 145B illustrated in FIG. 30 is composed of one component.

Figure 34:
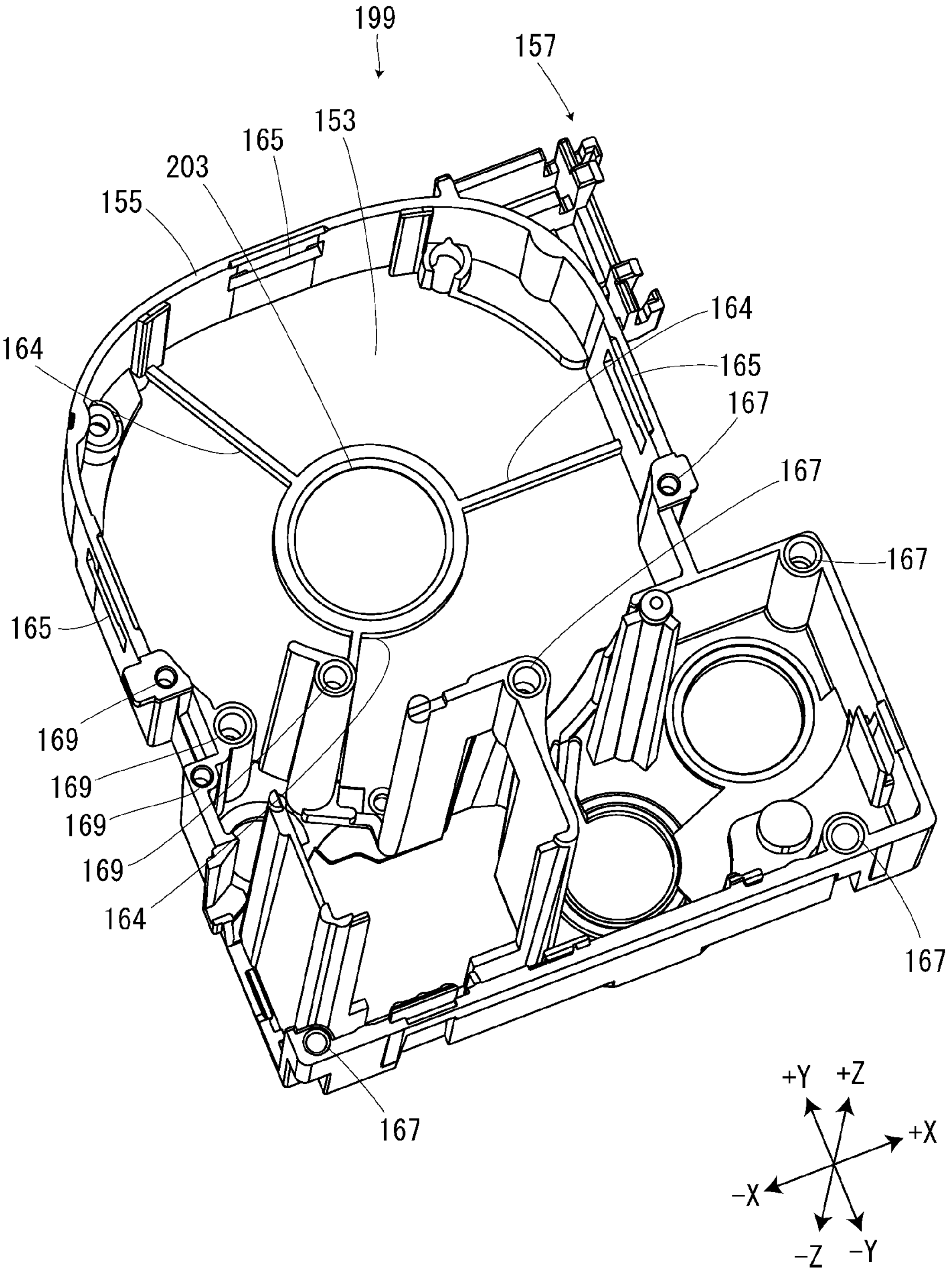
FIG. 34 is a perspective view of a case portion main body of a third case portion A included in the tape cartridge A of the fifth embodiment.

As illustrated in FIG. 34, the case portion main body 199 corresponds to the third case portion 145B of the first embodiment excluding the third core projection 159. The third base wall portion 153 of the case portion main body 199 is provided with an engagement opening 203 corresponding to a location where the third core projection 159 is provided in the third case portion 145 of the first embodiment. The engagement opening 203 is formed in a substantially circular shape and is engaged with the rotating body 201.

Figure 35:
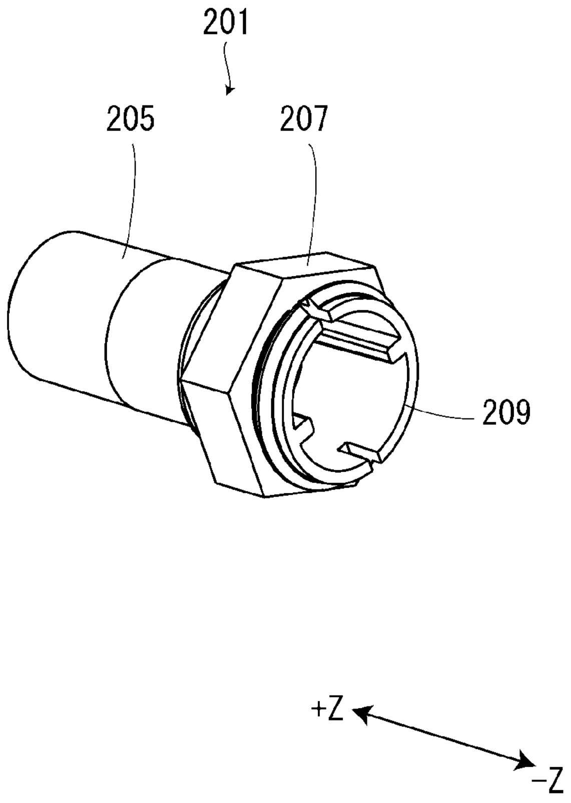
FIG. 35 is a perspective view of a rotating body of the third case portion A included in the tape cartridge A of the fifth embodiment.

The rotating body 201 is rotatably supported by the case portion main body 199 such that the Z axis is the rotation axis direction. As illustrated in FIG. 35, the rotating body 201 is formed in a substantially hexagonal bolt shape. That is, the rotating body 201 includes the first rotating body portion 205 and the second rotating body portion 207. The first rotating body portion 205 is formed in a substantially cylindrical shape extending in the rotation axis direction, that is, the Z axis, and is inserted into the core hole 137 provided in the tape core 117A. That is, the first rotating body portion 205 functions as the third core projection 159. The second rotating body portion 207 is coupled to the end portion of the first rotating body portion 205 in the −Z direction, and is formed in a substantially regular hexagonal tubular shape. The outer diameter of the second rotating body portion 207 is larger than the outer diameter of the first rotating body portion 205 and slightly smaller than the inner diameter of the engaging recess portion 193. The second rotating body portion 207 enters the engaging recess portion 193 provided in the tape core 117A, and engages with the engaging recess portion 193 not to rotate with respect to the engaging recess portion 193.

A rotating body engaging section 209 protrudes in the −Z direction from the end surface of the second rotating body portion 207 on the side opposite to the first rotating body portion 205 side, that is, the end surface in the −Z direction. The rotating body engaging section 209 is formed in a substantially cylindrical shape and is engaged with the engagement opening 203 provided in the case portion main body 199. That is, the outer diameter of the rotating body engaging section 209 is slightly smaller than the diameter of the engagement opening 203.

The rotating body 201 becomes rotatable integrally with the tape core 117A by engaging the second rotating body portion 207 provided in the rotating body 201 with the engaging recess portion 193 provided in the tape core 117A. That is, when the tape 115A is fed from the tape core 117A, the rotating body 201 rotates integrally with the tape core 117A.

Figure 31:
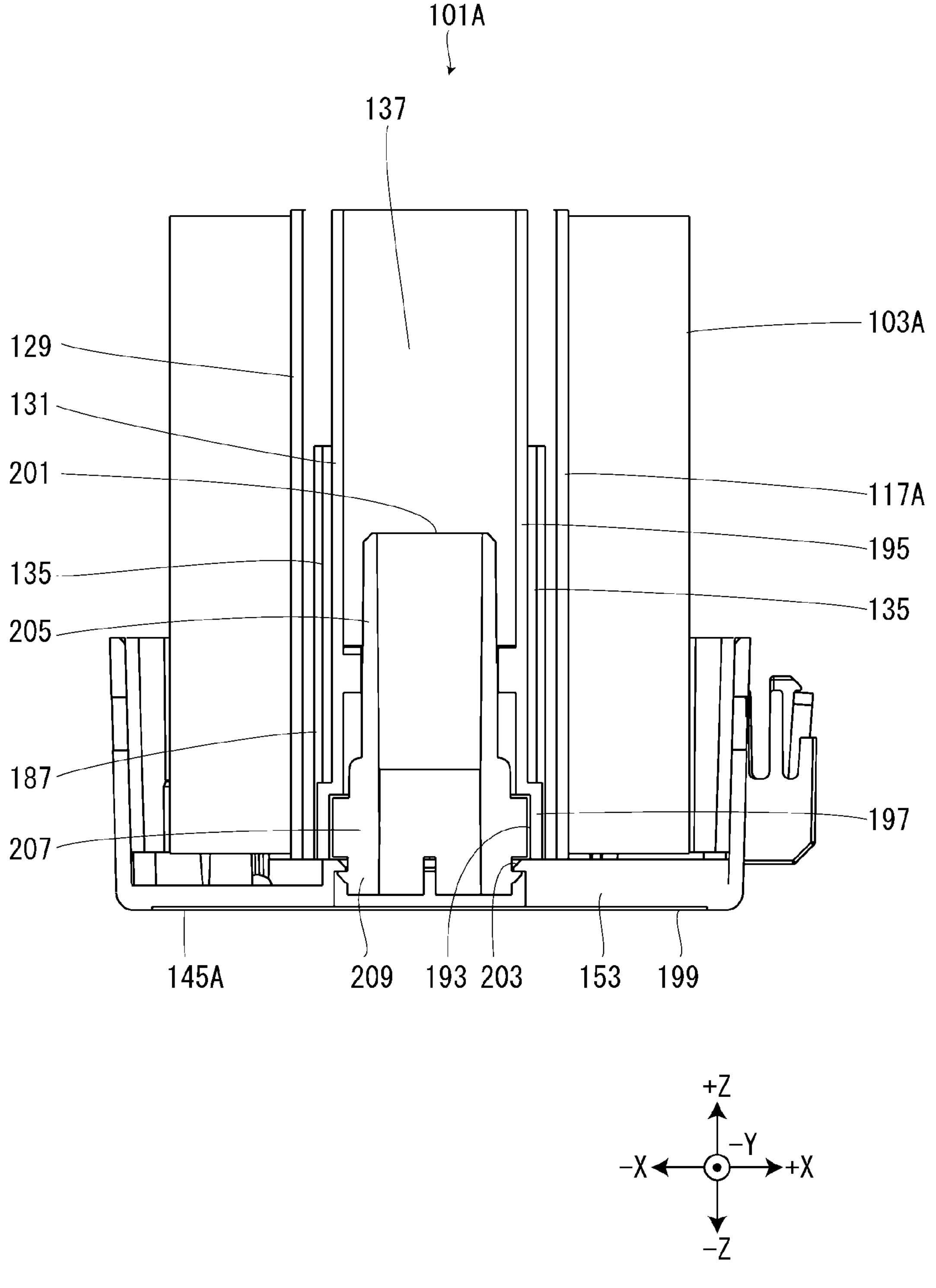
FIG. 31 is a sectional view illustrating a state where a tape roll A is replaced with another tape roll A in the tape cartridge A of the fifth embodiment.

As illustrated in FIG. 31, in order for the user to replace the tape roll 103A with another tape roll 103A in the tape cartridge 101A, when the other tape roll 103A is placed on the third base wall portion 153, the third core projection 159 is inserted into the core hole 137 of the tape core 117A included in the other tape roll 103A. At this time, the second rotating body portion 207 provided in the third case portion 145A engages with the engaging recess portion 193 provided in the tape core 117A and is received by the engaging recess portion 193. Therefore, the insertion of the third core projection 159 into the core hole 137 of the tape core 117A is not blocked by the second rotating body portion 207, and the user can replace the tape roll 103A with another tape roll 103A.

Figure 32:
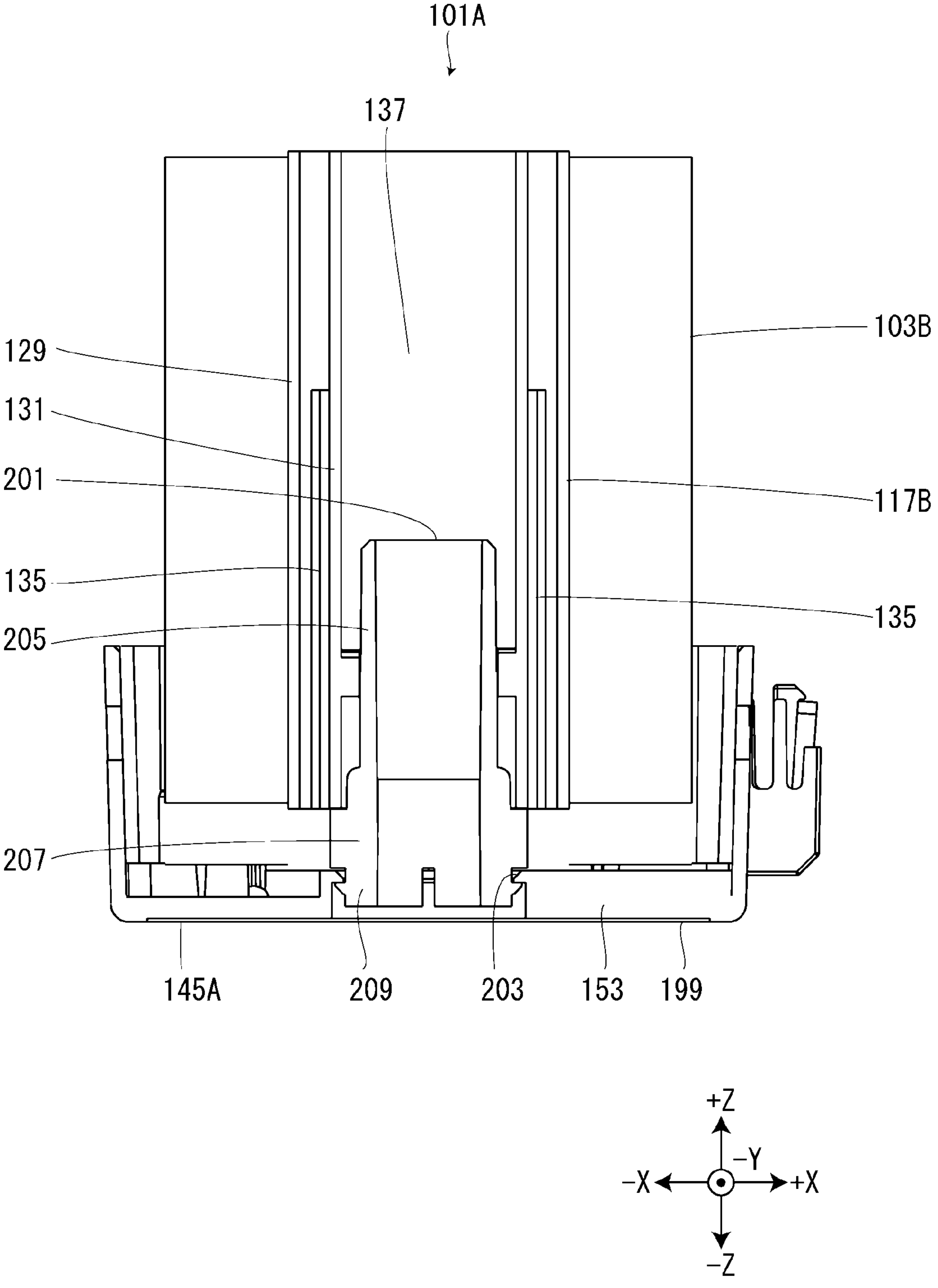
FIG. 32 is a sectional view illustrating a state where the tape roll A is to be replaced with the tape roll B in the tape cartridge A of the fifth embodiment.

On the other hand, as illustrated in FIG. 32, when the user mistakenly replaces the tape roll 103A with the tape roll 103B in the tape cartridge 101A, when the tape roll 103B is placed on the third base wall portion 153, the insertion of the third core projection 159 into the core hole 137 of the tape core 117B is blocked by the second rotating body portion 207. That is, while the third core projection 159 is being inserted into the core hole 137 of the tape core 117B, the surface of the second rotating body portion 207 provided in the third case portion 145A in the +Z direction comes into contact with the end surface of the tape core 117B in the −Z direction.

As described above, in the fifth embodiment, the second rotating body portion 207 is provided in the third case portion 145A, the engaging recess portion 193 is not provided in the tape core 117B, and accordingly, the third core projection 159 enters only halfway into the core hole 137 of the tape core 117B. In this state, even when the user mounts the first case portion 141 on the third case portion 145A, the user cannot mount the first case portion 141 on the third case portion 145A. Therefore, it is possible to suppress a case where the tape roll 103A is mistakenly replaced with the tape roll 103B in the tape cartridge 101A.

Further, the shapes of the second rotating body portion 207 and the engaging recess portion 193 are not particularly limited, and for example, the second rotating body portion 207 may be formed in a polygonal columnar shape, and the engaging recess portion 193 may be formed in a shape corresponding to the second rotating body portion 207. For example, the second rotating body portion 207 may be formed in a square columnar shape, and the engaging recess portion 193 may be formed in a shape corresponding to the second rotating body portion 207. Further, the fact that the engaging recess portion 193 is formed in a shape corresponding to the second rotating body portion 207 means that the shape of the engaging recess portion 193 viewed from the rotation axis direction of the tape core 117 is formed in a polygonal shape in which the shape of the engaging recess portion 193 is slightly larger than the shape of the second rotating body portion 207 viewed from the rotation axis direction of the rotating body 201 such that the rotating body 201 can rotate integrally with the tape core 117. Further, the fact that the second rotating body portion 207 is formed in a "polygonal columnar shape" is a concept including a configuration in which the second rotating body portion 207 has a tubular shape, that is, a hollow body, and that the second rotating body portion 207 is a columnar shape, that is, a solid body. That is, when the first rotating body portion 205 and the second rotating body portion 207 are not provided with the insertion projection 22 in the tape printing apparatus 1, the first rotating body portion 205 and the second rotating body portion 207 do not have to have a tubular shape with a space in which the insertion projection 22 is inserted, and may have a columnar shape having no space inside.

A protrusion portion may be provided on one of the second rotating body portion 207 and the engaging recess portion 193, and a recess portion capable of engaging with the protrusion portion may be provided on the other of the second rotating body portion 207 and the engaging recess portion 193. In the second rotating body portion 207, the location where the protrusion portion or the recess portion is provided may be an end surface of the second rotating body portion 207, that is, a surface in the +Z direction, or an outer peripheral surface of the second rotating body portion 207. The location where the protrusion portion or the recess portion is provided in the engaging recess portion 193 may be the bottom surface of the engaging recess portion 193 or the inner peripheral surface of the engaging recess portion 193. For example, a pin-shaped protrusion portion is provided on the surface of the second rotating body portion 207 in the +Z direction, and a recess portion that engages with the pin-shaped protrusion portion is provided on the surface of the engaging recess portion 193 facing the second rotating body portion 207, that is, on the bottom surface of the engaging recess portion 193. In this configuration, the rotating body 201 can rotate integrally with the tape core 117 by engaging the protrusion portion and the recess portion. In this case, the shapes of the second rotating body portion 207 and the engaging recess portion 193 are not limited to a configuration in which the second rotating body portion 207 is formed in a polygonal columnar shape and the engaging recess portion 193 is formed in a shape corresponding to the second rotating body portion 207, and for example, may be a configuration in which the second rotating body portion 207 is formed in a columnar shape and the engaging recess portion 193 has a shape corresponding to the second rotating body portion 207, that is, the opening portion of the engaging recess portion 193 in the −Z direction is formed in a circular shape. In addition, a protrusion portion and a recess portion may be provided in both the second rotating body portion 207 and the engaging recess portion 193. In this configuration, the protrusion portion of the second rotating body portion 207 and the recess portion of the engaging recess portion 193 are engaged with each other, and the recess portion of the second rotating body portion 207 and the protrusion portion of the engaging recess portion 193 are engaged.

Further, not only the two types of tape cartridges 101, which are the tape cartridge 101A and the tape cartridge 101B, but also a plurality of types of tape cartridges 101 having different shapes of the second rotating body portion 207 and the engaging recess portion 193 may be prepared. For example, the tape cartridge 101A has a hexagonal shape, the tape cartridge 101B has a square shape, and a tape cartridge 101C has a circular shape. As a result, it is possible to suppress the replacement of the plurality of types of tape cartridges 101 with the wrong type of tape roll 103.

As described above, the tape cartridge 101A of the first to fifth embodiments includes the tape roll 103A, a ribbon roll 105A, and the cartridge case 111, and can be mounted on the tape printing apparatus 1. The tape roll 103A includes the tape 115A and the tape core 117A around which the tape 115A is wound. The tape core 117A is provided with the core hole 137 and the outer recess portion 187, the core hole 137, the outer edge recess portion 189, or the engaging recess portion 193, which functions as a receiving section. The ribbon roll 105A includes an ink ribbon 119A and the paying-out core 121 around which the ink ribbon 119A is wound. The cartridge case 111 includes the third base wall portion 153 and the third core projection 159 protruding from the third base wall portion 153 and inserted into the core hole 137. The cartridge case 111 accommodates the tape roll 103A in a replaceable manner with another tape roll 103A, and accommodates the ribbon roll 105A. The tape cartridge 101B can be mounted on the tape printing apparatus 1. The tape cartridge 101B includes the tape roll 103B. The tape roll 103B has the tape 115B which is different from the tape 115A, and the tape core 117B around which the tape 115B is wound. The tape core 117B has a different shape from the tape core 117A. The cartridge case 111 of the tape cartridge 101A is provided with the outer protrusion portion 185, the third core projection 159, the outer edge protrusion portion 191, or the second rotating body portion 207 that are received by the outer recess portion 187, the core hole 137, the outer edge recess portion 189, or the engaging recess portion 193 and function as a blocking section. The outer protrusion portion 185, the third core projection 159, the outer edge protrusion portion 191, or the second rotating body portion 207 come into contact with the tape core 117B when the tape roll 103A is mistakenly replaced with the tape roll 103B, thereby blocking the insertion of the third core projection 159 into the core hole 137 of the tape core 117B.

According to this configuration, the outer protrusion portion 185 or the like that functions as a blocking section comes into contact with the tape core 117B, thereby blocking the insertion of the third core projection 159 into the core hole 137 of the tape core 117B. Accordingly, it is possible to suppress a case where the tape roll 103A is mistakenly replaced with the tape roll 103B in the tape cartridge 101A. Therefore, it is possible to avoid printing on the tape 115B by the ink ribbon 119A which is not suitable for printing on the tape 115B.

Other Modification Examples

It is needless to say that the present disclosure is not limited to the above-described embodiment, and various configurations can be adopted without departing from the gist thereof. For example, the above-described embodiment can be changed to the following aspects in addition to the above-described aspects. In addition, a configuration in which embodiments and modification examples are combined may be used.

The outer recess portion 187 is not limited to the tape core 117 having a double-cylinder structure configured by a space between the outer tube portion 129 and the inner tube portion 131. For example, the outer recess portion 187 may be configured by an annular recess portion provided on an end surface in the −Z direction in the tape core 117 having a single structure.

Figure 36:
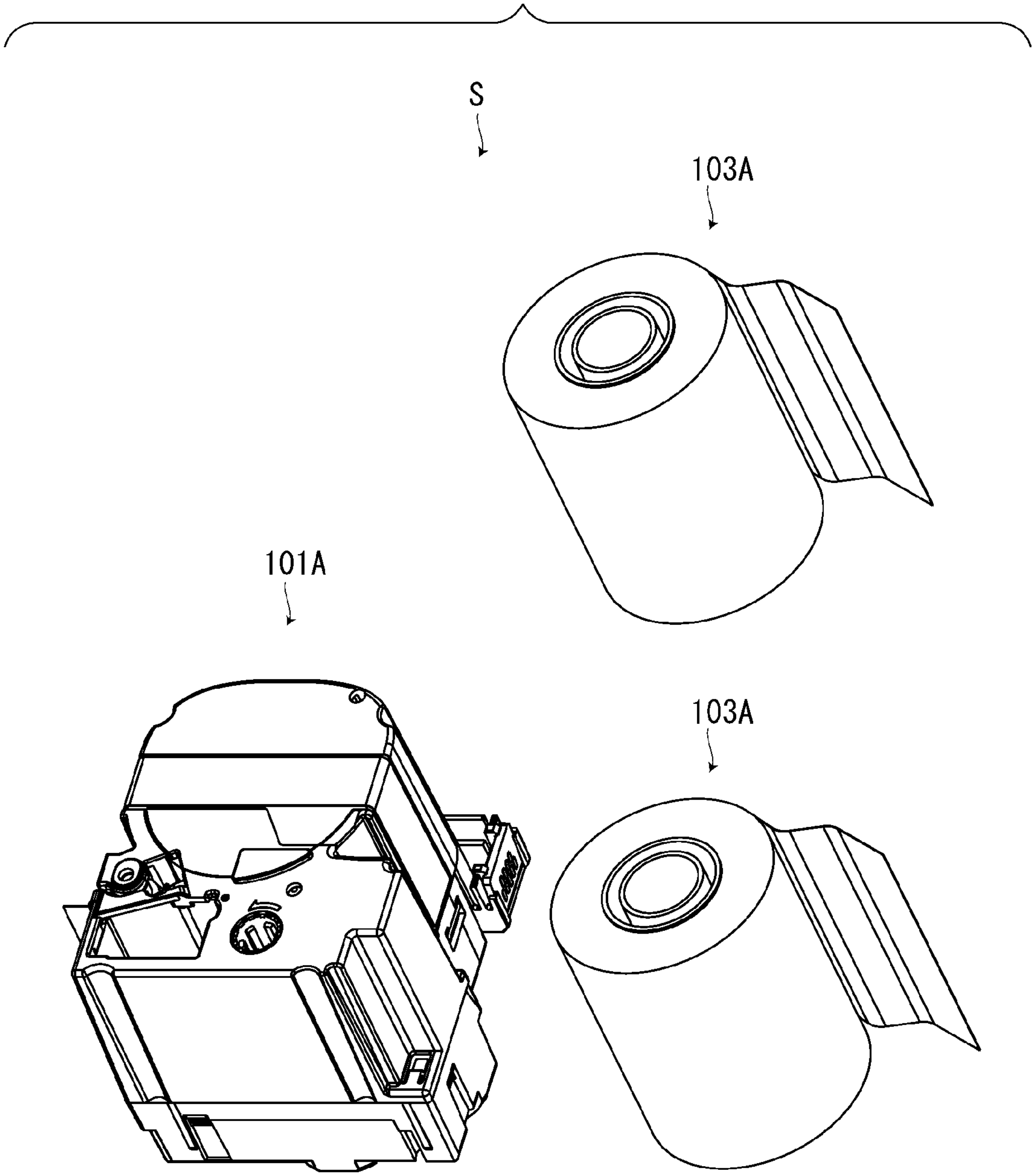
FIG. 36 is a perspective view of a tape cartridge set.

As illustrated in FIG. 36, the plurality of tape rolls 103A and the tape cartridge 101A may form a tape cartridge set S. That is, the tape cartridge set S includes the plurality of tape rolls 103A and the tape cartridge 101A. As a result, in addition to the tape cartridge 101A, a replacement tape roll 103A can be provided to the user in advance. In addition, the tape cartridge set S may be configured to include the cartridge case 111 including the third case portion A instead of the tape cartridge 101A. That is, the tape cartridge set S may be configured to include the cartridge case 111 including the third case portion A and the plurality of tape rolls 103A. In this case, the user can create the tape cartridge 101 by accommodating the tape roll 103, which is one of the plurality of tape rolls 103A, in the cartridge case 111.

Additional Note

Hereinafter, the tape cartridge, the tape roll, and the tape cartridge set will be additionally described.

There is provided a tape cartridge which is a tape cartridge A configured to be mounted on a tape printing apparatus, including: a tape roll A including a tape A and a tape core A which is provided with a core hole and a receiving section and around which the tape A is wound; a ribbon roll including an ink ribbon and a paying-out core around which the ink ribbon is wound; and a cartridge case having a base wall portion and a core projection protruding from the base wall portion and inserted into the core hole, accommodating the tape roll A in a replaceable manner with another tape roll A, and accommodating the ribbon roll, in which the cartridge case is provided with a blocking section received by the receiving section, and the blocking section blocks insertion of the core projection into the core hole of a tape core B around which a tape B, which is different in type from the tape A, is wound and which has a shape different from that of the tape core A, by contact with the tape core B when the tape roll A is mistakenly replaced with a tape roll B included in a tape cartridge B, which is configured to be mounted on the tape printing apparatus, and including the tape B and the tape core B.

According to this configuration, the blocking section comes into contact with the tape core B, thereby blocking the insertion of the core projection into the core hole of the tape core B. Accordingly, it is possible to suppress a case where the tape roll A is mistakenly replaced with the tape roll B in the tape cartridge A. Therefore, it is possible to avoid printing on the tape by an ink ribbon that is not suitable for printing on the tape B.

The third base wall portion 153 is an example of the "base wall portion." The third core projection 159 is an example of a "core projection."

In this case, it is preferable that the base wall portion be provided with an outer protrusion portion that is positioned on a radially outer side of the core projection and functions as the blocking section by contact with an end surface of the tape core B, and an end surface of the tape core A be provided with an outer recess portion that is positioned on a radially outer side of the core hole and functions as the receiving section.

According to this configuration, the outer protrusion portion comes into contact with the end surface of the tape core B, thereby blocking the insertion of the core projection into the core hole of the tape core B.

In this case, it is preferable that a core hole rib portion be provided inside the core hole of the tape core B, the core projection function as the blocking section by contact with the core hole rib portion of the tape core B, and a core hole rib portion be provided at a position where the core projection is not in contact with the core hole rib portion on an inside of the core hole of the tape core A, and the core hole function as the receiving section.

According to this configuration, the core projection comes into contact with the core hole rib of the tape core B, thereby blocking the insertion of the core projection into the core hole of the tape core B.

In this case, it is preferable that the base wall portion be provided with an outer edge protrusion portion that is positioned at an outer edge portion of the core projection and functions as the blocking section by contact with an end surface of the tape core B, and an end surface of the tape core A be provided with an outer edge recess portion that functions as the receiving section on an outer edge portion of a projection insertion port which is an end portion of the core hole.

According to this configuration, the outer edge protrusion portion comes into contact with the end surface of the tape core B, thereby blocking the insertion of the core projection into the core hole of the tape core B.

In this case, it is preferable that the cartridge case include a case portion main body and a rotating body provided to be rotatable integrally with the tape roll A with respect to the case portion main body, the rotating body include a first rotating body portion that functions as the core projection, and a second rotating body portion that functions as the blocking section by contact with an end surface of the tape core B, and an end surface of the tape core A be provided with an engaging recess portion that engages with the second rotating body portion and functions as the receiving section.

According to this configuration, the second rotating body portion comes into contact with the end surface of the tape core B, thereby blocking the insertion of the core projection into the core hole of the tape core B.

In this case, it is preferable that the second rotating body portion be formed in a polygonal columnar shape, and the engaging recess portion be formed in a shape corresponding to the second rotating body portion.

According to this configuration, the tape roll A and the rotating body can be integrally rotatable by a simple configuration.

In this case, it is preferable that a protrusion portion be provided on one of the second rotating body portion and the engaging recess portion, and a recess portion that is engageable with the protrusion portion be provided on the other side of the second rotating body portion and the engaging recess portion.

According to this configuration, the tape roll A and the rotating body can be integrally rotatable by a simple configuration.

In this case, it is preferable that, in an unused tape cartridge A, the length of the ink ribbon be at least two times the length of the tape A.

According to this configuration, even when the tape roll accommodated in the cartridge case is in the tape end state, the user can continue to use the tape cartridge by replacing only the tape roll without replacing the ink ribbon.

In this case, it is preferable that a circuit substrate configured to store information indicating a remaining amount of the ink ribbon further be provided, and the tape cartridge A be configured to be mounted on the tape printing apparatus configured to read the information stored in the circuit substrate.

According to this configuration, information indicating the remaining amount of the ink ribbon can be provided to the tape printing apparatus to which the tape cartridge is mounted.

There is provided a tape roll which is a tape roll A included in a tape cartridge A configured to be mounted on a tape printing apparatus, in which the tape cartridge A includes the tape roll A, a ribbon roll, and a cartridge case, the tape roll A includes a tape A and a tape core A which is provided with a core hole and a receiving section and around which the tape A is wound, the ribbon roll includes an ink ribbon and a paying-out core around which the ink ribbon is wound, and the cartridge case includes a base wall portion and a core projection protruding from the base wall portion and inserted into the core hole, accommodates the tape roll A in a replaceable manner with another tape roll A, and accommodates the ribbon roll, the cartridge case is provided with a blocking section that blocks insertion of the core projection into a core hole of a tape core B around which a tape B, which is different in type from the tape A, is wound and which has a shape different from that of the tape core A, by contact with the tape core B when the tape roll A is mistakenly replaced with a tape roll B included in a tape cartridge B, which is configured to be mounted on the tape printing apparatus, and including the tape B and the tape core B, and the receiving section provided in the tape core A of the tape roll A accommodated in the cartridge case receives the blocking section.

According to this configuration, the blocking section comes into contact with the tape core B, thereby blocking the insertion of the core projection into the core hole of the tape core B. Accordingly, it is possible to suppress a case where the tape roll A is mistakenly replaced with the tape roll B in the tape cartridge A. Therefore, it is possible to avoid printing on the tape by an ink ribbon that is not suitable for printing on the tape B.

There is provided a tape cartridge set that configures a tape cartridge A configured to be mounted on a tape printing apparatus, including: a plurality of tape rolls A including a tape A and a tape core A which is provided with a core hole and a receiving section and around which the tape A is wound; a ribbon roll including an ink ribbon and a paying-out core around which the ink ribbon is wound; and a cartridge case having a base wall portion and a core projection protruding from the base wall portion and inserted into the core hole, configured to accommodate one tape roll A of the plurality of tape rolls A in a replaceable manner with another tape roll A, and configured to accommodate the ribbon roll, in which the cartridge case is provided with a blocking section received by the receiving section, and the blocking section blocks insertion of the core projection into the core hole of a tape core B around which a tape B, which is different in type from the tape A, is wound and which has a shape different from that of the tape core A, by contact with the tape core B when the tape roll A is mistakenly replaced with a tape roll B included in a tape cartridge B, which is configured to be mounted on the tape printing apparatus, and including the tape B and the tape core B.

According to this configuration, the blocking section comes into contact with the tape core B, thereby blocking the insertion of the core projection into the core hole of the tape core B. Accordingly, it is possible to suppress a case where the tape roll A is mistakenly replaced with the tape roll B in the tape cartridge A. Therefore, it is possible to avoid printing on the tape by an ink ribbon that is not suitable for printing on the tape B. Further, in addition to the tape cartridge, a replacement tape roll can be provided to the user in advance.

What is claimed is:

1. A tape cartridge which is a tape cartridge A configured to be mounted on a tape printing apparatus, comprising:

a tape roll A including a tape A and a tape core A which is provided with a core hole and a receiving section and around which the tape A is wound;

a ribbon roll including an ink ribbon and a paying-out core around which the ink ribbon is wound; and a cartridge case having a base wall portion and a core projection protruding from the base wall portion and inserted into the core hole, accommodating the tape roll A in a replaceable manner with another tape roll A, and accommodating the ribbon roll, wherein the cartridge case is provided with a blocking section received by the receiving section, and the blocking section blocks insertion of the core projection into the core hole of a tape core B around which a tape B, which is different in type from the tape A, is wound and which has a shape different from that of the tape core A, by contact with the tape core B when the tape roll A is mistakenly replaced with a tape roll B included in a tape cartridge B, which is configured to be mounted on the tape printing apparatus, and including the tape B and the tape core B.

2. The tape cartridge according to claim 1, wherein the base wall portion is provided with an outer protrusion portion that is positioned on a radially outer side of the core projection and functions as the blocking section by contact with an end surface of the tape core B, and an end surface of the tape core A is provided with an outer recess portion that is positioned on a radially outer side of the core hole and functions as the receiving section.

3. The tape cartridge according to claim 1, wherein a core hole rib portion is provided inside the core hole of the tape core B, the core projection functions as the blocking section by contact with the core hole rib portion of the tape core B, and a core hole rib portion is provided at a position where the core projection is not in contact with the core hole rib portion on an inside of the core hole of the tape core A, and the core hole functions as the receiving section.

4. The tape cartridge according to claim 1, wherein the base wall portion is provided with an outer edge protrusion portion that is positioned at an outer edge portion of the core projection and functions as the blocking section by contact with an end surface of the tape core B, and an end surface of the tape core A is provided with an outer edge recess portion that functions as the receiving section on an outer edge portion of a projection insertion port which is an end portion of the core hole.

5. The tape cartridge according to claim 1, wherein the cartridge case includes a case portion main body and a rotating body provided to be rotatable integrally with the tape roll A with respect to the case portion main body, the rotating body includes a first rotating body portion that functions as the core projection, and a second rotating body portion that functions as the blocking section by contact with an end surface of the tape core B, and an end surface of the tape core A is provided with an engaging recess portion that engages with the second rotating body portion and functions as the receiving section.

6. The tape cartridge according to claim 5, wherein the second rotating body portion is formed in a polygonal columnar shape, and the engaging recess portion is formed in a shape corresponding to the second rotating body portion.

7. The tape cartridge according to claim 5, wherein a protrusion portion is provided on one of the second rotating body portion and the engaging recess portion, and a recess portion that is engageable with the protrusion portion is provided on the other side of the second rotating body portion and the engaging recess portion.

8. The tape cartridge according to claim 1, wherein in an unused tape cartridge A, a length of the ink ribbon is at least two times a length of the tape A.

9. The tape cartridge according to claim 8, further comprising:

a circuit substrate configured to store information indicating a remaining amount of the ink ribbon, wherein the tape cartridge A is configured to be mounted on the tape printing apparatus configured to read the information stored in the circuit substrate.

10. A tape roll which is a tape roll A included in a tape cartridge A configured to be mounted on a tape printing apparatus, wherein the tape cartridge A includes the tape roll A, a ribbon roll, and a cartridge case, the tape roll A includes a tape A and a tape core A which is provided with a core hole and a receiving section and around which the tape A is wound, the ribbon roll includes an ink ribbon and a paying-out core around which the ink ribbon is wound, and the cartridge case includes a base wall portion and a core projection protruding from the base wall portion and inserted into the core hole, accommodates the tape roll A in a replaceable manner with another tape roll A, and accommodates the ribbon roll, the cartridge case is provided with a blocking section that blocks insertion of the core projection into a core hole of a tape core B around which a tape B, which is different in type from the tape A, is wound and which has a shape different from that of the tape core A, by contact with the tape core B when the tape roll A is mistakenly replaced with a tape roll B included in a tape cartridge B, which is configured to be mounted on the tape printing apparatus, and including the tape B and the tape core B, and the receiving section provided in the tape core A of the tape roll A accommodated in the cartridge case receives the blocking section.

11. A tape cartridge set that configures a tape cartridge A configured to be mounted on a tape printing apparatus, comprising:

a plurality of tape rolls A including a tape A and a tape core A which is provided with a core hole and a receiving section and around which the tape A is wound;

a ribbon roll including an ink ribbon and a paying-out core around which the ink ribbon is wound; and a cartridge case having a base wall portion and a core projection protruding from the base wall portion and inserted into the core hole, configured to accommodate one tape roll A of the plurality of tape rolls A in a replaceable manner with another tape roll A, and configured to accommodate the ribbon roll, wherein the cartridge case is provided with a blocking section received by the receiving section, and the blocking section blocks insertion of the core projection into the core hole of a tape core B around which a tape B, which is different in type from the tape A, is wound and which has a shape different from that of the tape core A, by contact with the tape core B when the tape roll A is mistakenly replaced with a tape roll B included in a tape cartridge B, which is configured to be mounted on the tape printing apparatus, and including the tape B and the tape core B.

* * * * *